United States Patent
Ichimura

(10) Patent No.: US 11,689,243 B2
(45) Date of Patent: Jun. 27, 2023

(54) WIRELESS COMMUNICATION DEVICE

(71) Applicant: Funai Electric Co., Ltd., Osaka (JP)

(72) Inventor: Yasuo Ichimura, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 161 days.

(21) Appl. No.: 17/120,805

(22) Filed: Dec. 14, 2020

(65) Prior Publication Data

US 2021/0211155 A1 Jul. 8, 2021

(30) Foreign Application Priority Data

Jan. 7, 2020 (JP) .................................. 2020-001055

(51) Int. Cl.
*H04B 1/71* (2011.01)
*H04B 1/10* (2006.01)
*H04B 1/12* (2006.01)

(52) U.S. Cl.
CPC ......... *H04B 1/7101* (2013.01); *H04B 1/1036* (2013.01); *H04B 1/123* (2013.01)

(58) Field of Classification Search
CPC .... H04B 1/7101; H04B 1/1036; H04B 1/123; H04B 1/406; H04B 15/00; H04B 1/1027; H04B 10/697; H04B 2001/7154; H04B 1/7097; H04B 17/336; H04B 1/109; H04B 1/7107; H04B 2001/7152; H04B 17/318

See application file for complete search history.

(56) References Cited

U.S. PATENT DOCUMENTS

| | | | | |
|---|---|---|---|---|
| 8,861,661 | B2* | 10/2014 | Fujimura | H04B 7/15542 375/349 |
| 10,164,722 | B1* | 12/2018 | Napoles | H04B 1/406 |
| 2002/0155812 | A1 | 10/2002 | Takada | |
| 2009/0247085 | A1* | 10/2009 | Misumi | H04W 16/14 455/67.11 |

(Continued)

FOREIGN PATENT DOCUMENTS

JP 2002-271234 A 9/2002

*Primary Examiner* — Lana N Le
(74) *Attorney, Agent, or Firm* — Global IP Counselors, LLP

(57) ABSTRACT

A wireless communication device comprises a first communication unit, a second communication unit and a single control unit. The first communication unit wirelessly communicates by a first communication signal according to a first communication standard. The second communication unit wirelessly communicates by a second communication signal according to a second communication standard. The second communication signal has a frequency band that overlaps with that of the first communication signal. The second communication standard is different from the first communication standard. The control unit generates a first interference suppression signal for suppressing interference in the second communication signal and a second interference suppression signal for suppressing interference in the first communication signal, and suppresses the interference in the first communication signal and the interference in the second communication signal based on the first interference suppression signal and the second interference suppression signal.

14 Claims, 17 Drawing Sheets

(56) References Cited

U.S. PATENT DOCUMENTS

| | | | |
|---|---|---|---|
| 2012/0264381 A1* | 10/2012 | Eisenhut | H04B 1/406 |
| | | | 455/90.1 |
| 2015/0031317 A1* | 1/2015 | Wang | H03F 3/24 |
| | | | 455/114.3 |
| 2015/0264620 A1* | 9/2015 | Timus | H04W 36/32 |
| | | | 455/440 |
| 2019/0245566 A1* | 8/2019 | Luo | H04B 1/525 |
| 2022/0225225 A1* | 7/2022 | Cui | H04W 48/18 |
| 2022/0231711 A1* | 7/2022 | Cox | H04L 5/1461 |
| 2022/0352915 A1* | 11/2022 | Abedini | H04B 1/1081 |

\* cited by examiner

WIRELESS COMMUNICATION DEVICE

CROSS-REFERENCE TO RELATED APPLICATIONS

This application claims priority to Japanese Patent Application No. 2020-001055 filed on Jan. 7, 2020. The entire disclosure of Japanese Patent Application No. 2020-001055 is hereby incorporated herein by reference.

BACKGROUND

Field of the Invention

This invention generally relates to a wireless communication device. More specifically, the present invention relates to a wireless communication device that performs wireless communication by communication signals with overlapping frequency bands.

Background Information

Conventionally, a wireless communication device that performs wireless communication by communication signals with overlapping frequency bands is known (see, Japanese Patent Application Publication No. 2002-271234 (Patent Literature 1), for example).

The above-described Patent Literature 1 discloses an interference signal removal device (a wireless communication device) comprising an interference signal estimation unit, an interference signal extraction unit, and a synthesizer. The interference signal estimation unit described in the above-described Patent Literature 1 is configured to estimate an interference signal included in a reception signal, and to output an interference signal estimation factor, which is a result of the estimation, to the interference signal extraction unit. The interference signal extraction unit is configured to extract the interference signal from the input reception signal based on the interference signal estimation factor input from the interference signal estimation unit, and to output the extracted interference signal to the synthesizer. The synthesizer is configured to remove the interference signal from the reception signal by subtracting the interference signal input from the interference signal extraction unit from the input reception signal, and to output the reception signal after the interference removal from the interference signal removal device. In the above-described Patent Literature 1, the interference signal removal device (the wireless communication device) is configured to acquire a signal including a wideband desired signal and a narrowband interference signal as a reception signal, and to remove the narrowband interference signal. The wideband desired signal and the narrowband interference signal disclosed in the above-described Patent Literature 1 are signals whose frequency bands overlap with each other.

SUMMARY

However, the interference signal removal device (the wireless communication device) of the above-described Patent Literature 1 is configured to remove the narrowband interference signal from the wideband desired signal. Therefore, when communication is carried out by the wideband desired signal, it is possible to suppress the reduction of the reception sensitivity due to the narrowband interference signal. On the other hand, if a wideband interference signal is included in a narrowband desired signal, there is a problem in communication with the narrowband desired signal that the reception sensitivity is reduced due to the wideband interference signal.

One object of the present disclosure is to provide a wireless communication device with which, even when communication is performed using signals with frequency bands that overlap with each other, it is possible to suppress the reduction of the reception sensitivity in each communication by suppressing the interference caused by each signal in each communication.

In view of the state of the known technology and in accordance with a first aspect of the present disclosure, a wireless communication device comprises a first communication unit, a second communication unit and a single control unit. The first communication unit wirelessly communicates by a first communication signal according to a first communication standard. The second communication unit wirelessly communicates by a second communication signal according to a second communication standard. The second communication signal has a frequency band that overlaps with that of the first communication signal. The second communication standard is different from the first communication standard. The control unit generates a first interference suppression signal for suppressing interference caused by the first communication signal in the second communication signal and a second interference suppression signal for suppressing interference caused by the second communication signal in the first communication signal, and suppresses the interference in the first communication signal and the interference in the second communication signal based on the first interference suppression signal and the second interference suppression signal.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

Referring to FIGS. 1 to 8, the configuration of a wireless communication device 100 according to a first embodiment will be described.

Figure 1:
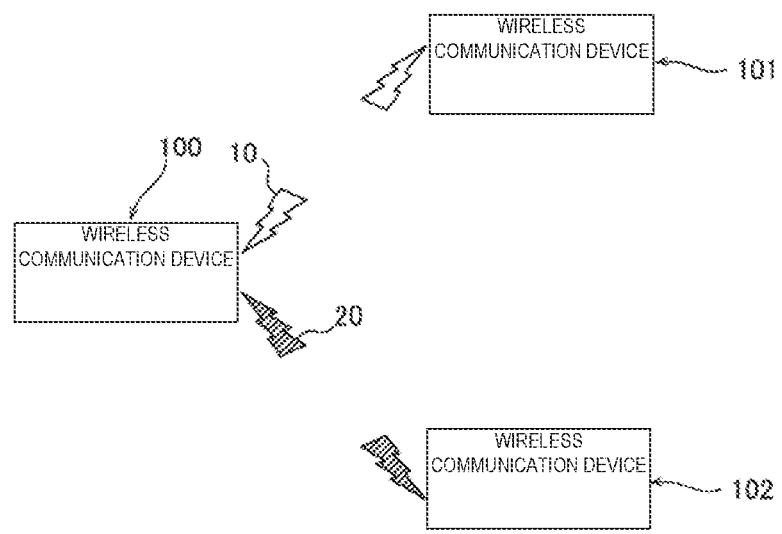
FIG. 1 is a schematic diagram illustrating a configuration in which a wireless communication device according to a first embodiment communicates with other wireless communication devices.

As shown in FIG. 1, the wireless communication device 100 according to the first embodiment is configured to communicate according to a plurality of communication standards. In the example shown in FIG. 1, the wireless communication device 100 is configured to communicate wirelessly with a wireless communication device 101 by a first communication signal 10 according to a first communication standard. The wireless communication device 100 is also configured to communicate wirelessly with a wireless communication device 102 by a second communication signal 20 according to a second communication standard. In the example shown in FIG. 1, hatching is shown for the second communication signal 20 in order to make it easier to understand the differences in communication standards. The wireless communication device 100 includes, for example, a cell phone, a smartphone, or other communication terminal. The wireless communication device 101 includes, for example, a communication device such as a wireless LAN router. The wireless communication device 102 includes, for example, a wireless headphone or other communication device.

In the first embodiment, the wireless communication device 100 is configured to communicate by Wi-Fi (registered trademark) as the first communication standard. The wireless communication device 100 is also configured to communicate by Bluetooth (registered trademark) as the second communication standard.

Figure 2:
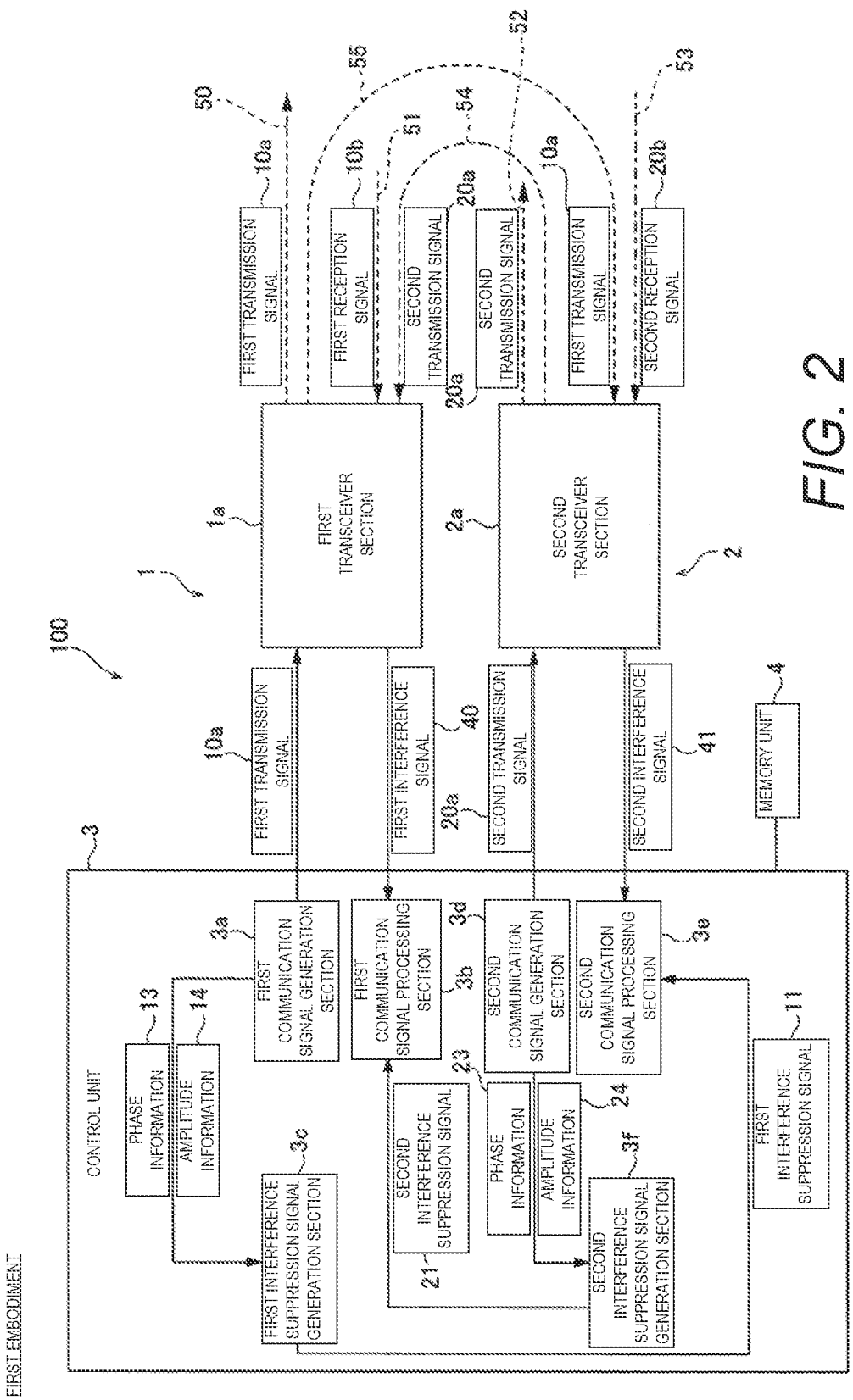
FIG. 2 is a block diagram showing the overall configuration of the wireless communication device according to the first embodiment.

As shown in FIG. 2, the wireless communication device 100 has a first communication unit 1 (e.g., a first communication module), a second communication unit 2 (e.g., a second communication module), a control unit 3 (e.g., a controller or a wireless communication module), and a memory unit 4 (e.g., a computer memory). In the first embodiment, the wireless communication device 100 is equipped with a single control unit 3.

The first communication unit 1 is configured to communicate wirelessly by the first communication signal 10 according to the first communication standard. Specifically, the first communication unit 1 is configured to communicate wirelessly with another wireless communication device (e.g., the wireless communication device 101) by transmitting and receiving the first communication signal 10. The first communication unit 1 includes a first transceiver section 1a. In the illustrated embodiment, the first transceiver section 1a is interfaced to a first communication signal generation section 3a as described below and a first communication signal processing section 3b as described below for transferring signals.

The first transceiver section 1a is configured to transmit and receive the first communication signal 10. The first transceiver section 1a includes, for example, an antenna.

The first communication signal 10 includes, for example, a signal in the 2.4 GHz (gigahertz) frequency band. The first communication signal 10 includes a first transmission signal 10a and a first reception signal 10b. The first transmission signal 10a is transmitted from the first transceiver section 1a, as shown in arrow 50. The first reception signal 10b is received by the first transceiver section 1a, as shown in arrow 51.

The second communication unit 2 is configured to communicate wirelessly by the second communication signal 20 whose frequency band overlaps with that of the first communication signal 10 according to the second communication standard that is different from the first communication standard. Specifically, the second communication unit 2 is configured to communicate wirelessly with another wireless communication device (e.g., the wireless communication device 102) by transmitting and receiving the second communication signal 20. The second communication unit 2 includes a second transceiver section 2a. In the illustrated embodiment, the second transceiver section 2a is interfaced to a second communication signal generation section 3d as described below and a second communication signal processing section 3e as described below for transferring signals.

The second transceiver section 2a is configured to transmit and receive the second communication signal 20. The second transceiver section 2a includes, for example, an antenna. In the illustrated embodiment, the wireless communication device 100 includes separate transceiver sections (e.g., the first transceiver section 1a and the second transceiver section 2a), and thus includes separate antennas (two antennas). However, the wireless communication device 100 can include a common transceiver section or a common antenna for the first communication signal 10 and the second communication signal 20. Furthermore, of course, the wireless common device 100 can include more than three transceiver sections or antennas.

The second communication signal 20 includes a signal in the frequency band that overlaps with that of the first communication signal 10. In the first embodiment, the second communication signal 20 includes, for example, a signal in the 2.4 GHz (gigahertz) band. The second communication signal 20 includes a second transmission signal 20a and a second reception signal 20b. The second transmission signal 20a is transmitted from the second transceiver section 2a, as shown in arrow 52. The second reception signal 20b is received by the second transceiver section 2a, as shown in arrow 53.

The control unit 3 is configured to generate a first interference suppression signal 11 for suppressing interference caused by the first communication signal 10 in the second communication signal 20. The control unit 3 is also configured to generate a second interference suppression signal 21 for suppressing interference caused by the second communication signal 20 in the first communication signal 10. The control unit 3 is also configured to perform a control for suppressing the interference in the first communication signal 10 and the interference in the second communication signal 20 based on the first interference suppression signal 11 and the second interference suppression signal 21 that have been generated. The control unit 3 includes, for example, an Integrated Circuit (IC) or Large-Scale Integration (LSI). In particular, in the illustrated embodiment, the control unit 3 includes a single microcontroller or processing circuitry that comprises a processor, a computer memory, and the like on a single chip or package, for example. Thus, in the illustrate embodiment, the control unit 3 forms a single part. The control unit 3 is configured to function as the first communication signal generation section 3a, the first communication signal processing section 3b, the first interference suppression signal generation section 3c, the second communication signal generation section 3d, the second communication signal processing section 3e, and the second interference suppression signal generation section 3f by executing various programs stored in the memory unit 4.

The first communication signal generation section 3a is configured to generate the first transmission signal 10a. The details of the first transmission signal 10a generated by the first communication signal generation section 3a will be described below.

The first communication signal processing section 3b is configured to process the first reception signal 10b received by the first transceiver section 1a. The first communication signal processing section 3b is configured to perform, for example, RF processing, such as frequency conversion, and baseband processing, such as AD conversion processing and DA conversion processing, on the first reception signal 10b.

The first interference suppression signal generation section 3c is configured to generate the first interference suppression signal 11 based on the first transmission signal 10a. The details of the configuration in which the first interference suppression signal generation section 3c generates the first interference suppression signal 11 will be described below.

The second communication signal generation section 3d is configured to generate the second transmission signal 20a. The details of the second transmission signal 20a generated by the second communication signal generation section 3d will be described below.

The second communication signal processing section 3e is configured to process the second reception signal 20b received by the second transceiver section 2a. The second communication signal processing section 3e is configured to perform, for example, the RF processing, the baseband processing, and the like on the second reception signal 20b.

The second interference suppression signal generation section 3f is configured to generate the second interference suppression signal 21 based on the second communication signal 20. The details of the configuration in which the second interference suppression signal generation section 3f generates the second interference suppression signal 21 will be described below.

In the illustrated embodiment, the first communication signal generation section 3a and the first communication signal processing section 3b can form a transceiver for the first communication signal 10. Thus, the first communication signal generation section 3a and the first communication signal processing section 3b can be formed by a modulator, a demodulator, a power amplifier, a low noise amplifier, an AD convertor, a DA convertor, and the like, that form the single chip or package of the control unit 3. Also, the second communication signal generation section 3d and the second communication signal processing section 3e can form a transceiver for the second communication signal 20. Thus, the second communication signal generation section 3d and the second communication signal processing section 3e can be formed by a modulator, a demodulator, a power amplifier, a low noise amplifier, an AD convertor, a DA convertor, and the like, that form the single chip or package of the control unit 3. Alternatively, the first communication signal generation section 3a and the first communication signal processing section 3b can only perform a baseband processing of a transceiver for the first communication signal 10 by being formed by an AD convertor, a DA convertor, and the like. Also, the second communication signal generation section 3d and the second communication signal processing section 3e can only perform a baseband processing of a transceiver for the second communication signal 20 by being formed by an AD convertor, a DA convertor, and the like. In this case, the first transceiver section 1a can further perform an RF processing of a transceiver for the first communication signal 10 by being formed by a modulator, a demodulator, a power amplifier, a low noise amplifier, and the like. Also, in this case, the second transceiver section 2a can further perform an RF processing of a transceiver for the second communication signal 20 by being formed by a modulator, a demodulator, a power amplifier, a low noise amplifier, and the like.

The memory unit 4 is configured to store various programs executed by the control unit 3. The memory unit 4 includes, for example, a non-volatile memory.

(First Communication Signal and Second Communication Signal)

Next, referring to FIG. 3, the first communication signal 10 and the second communication signal 20 will be described.

Figure 3:
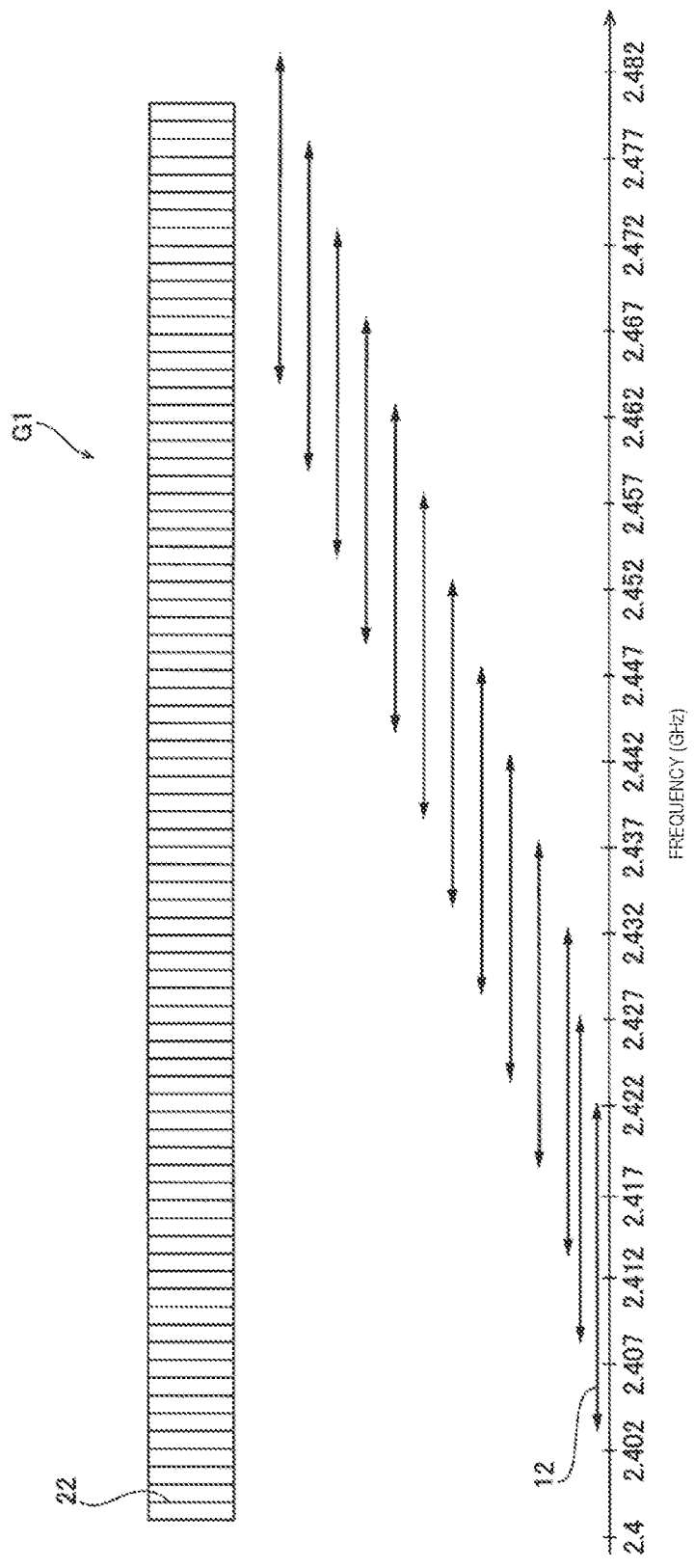
FIG. 3 is a schematic diagram illustrating frequency bands of a first communication signal and a second communication signal used by the wireless communication device according to the first embodiment.

FIG. 3 is a graph G1 illustrating the frequency bands of the first communication signal 10 and the second communication signal 20. The graph G1 is a graph in which the horizontal axis represents frequencies.

As shown in FIG. 3, the first communication signal 10 is a communication signal with a frequency band in the 2.4 GHz band. In the first embodiment, the first communication signal 10 has a plurality of channels 12 in the 2.4 GHz band. Specifically, each channel 12 is a communication signal with a frequency band having a channel width of 20 MHz (megahertz). The channels 12 are signals with different center frequencies spaced 5 MHz apart from each other.

The second communication signal 20 is a communication signal with a frequency band in the 2.4 GHz band. As shown in FIG. 3, the second communication signal 20 has a plurality of channels 22 in a frequency band that overlaps with that of the first communication signal 10 in the 2.4 GHz band. Specifically, each channel 22 is a communication signal with a frequency band having a channel width of 1 MHz. The second communication signal 20 communicates while randomly switching the channels 22 in the frequency band of the 2.4 GHz band.

Figure 4:
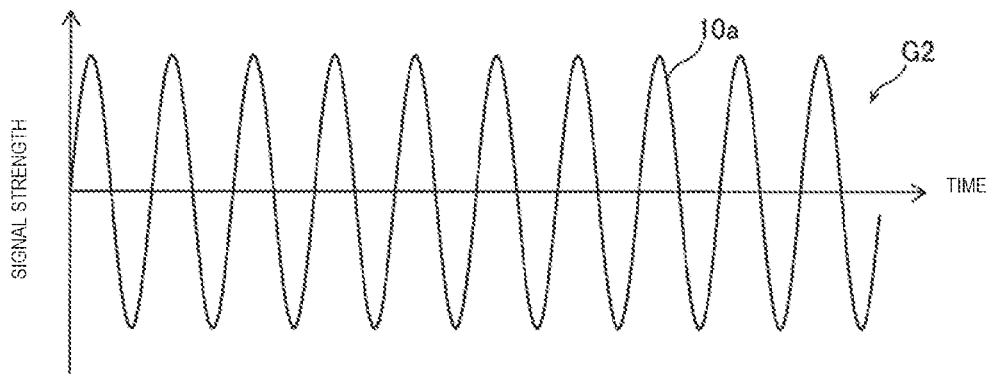
FIG. 4 is a graph illustrating the first communication signal.
Figure 5:
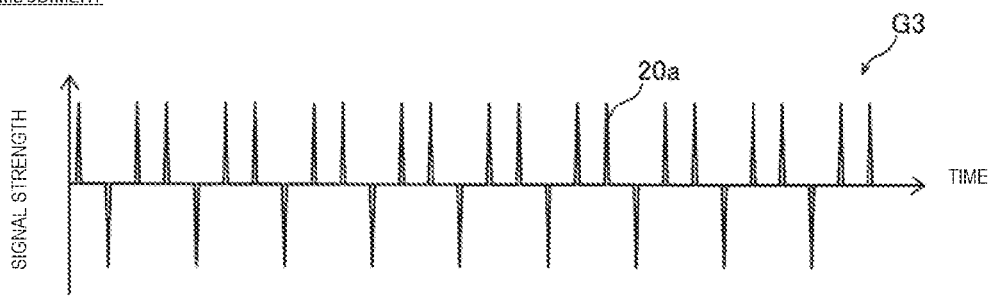
FIG. 5 is a graph illustrating the second communication signal.

A graph G2, shown in FIG. 4, is a graph schematically illustrating the first transmission signal 10a. In the graph G2, the horizontal axis represents time and the vertical axis represents the signal strength. A graph G3, shown in FIG. 5, is a graph schematically illustrating the second transmission signal 20a. In the graph G3, the horizontal axis represents time and the vertical axis represents the signal strength.

In the first embodiment, in order to make it easier to distinguish the first transmission signal 10a and the second transmission signal 20a from each other, the first transmission signal 10a is illustrated as a signal waveform having a sinusoidal shape, as shown in the graph G2. The second transmission signal 20a is illustrated as a signal waveform with a narrow peak shape, as shown in the graph G3. The first reception signal 10b is a signal having a waveform shape similar to the first transmission signal 10a. The second reception signal 20b is a signal having a waveform shape similar to the second transmission signal 20a.

(Interference in Communication Signals)

Here, both the first communication signal 10 and the second communication signal 20 are signals in the 2.4 GHz band and have frequency bands that overlap with each other. Therefore, when the second transmission signal 20a is input to the first transceiver section 1a, as shown in arrow 54 in FIG. 2, interference may occur in the first reception signal 10b due to the second transmission signal 20a. Also, in the second communication unit 2, when the first transmission signal 10a is input to the second transceiver section 2a, as shown in arrow 55 in FIG. 2, interference may occur in the second reception signal 20b due to the first transmission signal 10a.

Figure 6:
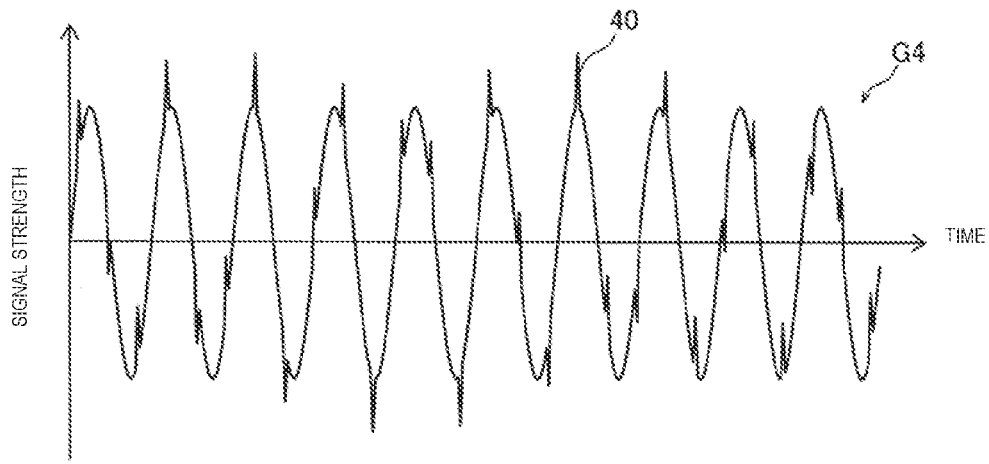
FIG. 6 is a graph illustrating an added signal of the first communication signal and the second communication signal.

A graph G4, shown in FIG. 6, is a graph schematically illustrating the interference signal. In the graph G4, the horizontal axis represents time and the vertical axis represents the signal strength. The interference signal is a signal generated by interference between the first communication signal 10 and the second communication signal 20. Therefore, both the first interference signal 40 and the second interference signal 41 have the same waveform shape as the interference signal.

When the first transmission signal 10a and the second reception signal 20b are input to the second communication unit 2, the signals interfere with each other to generate the second interference signal 41. Therefore, the reception sensitivity of the second reception signal 20b is reduced. If the reception sensitivity of the second reception signal 20b is reduced, the communication status will deteriorate, such as a decrease in communication speed or a decrease in throughput. In the illustrated embodiment, the interference relative to the second reception signal 20b (the interference in the second interference signal 41) occurs because the communications by the first communication unit 1 and the second communication unit 2 are performed simultaneously. In particular, in the illustrated embodiment, the interference relative to the second reception signal 20b (the interference in the second interference signal 41) occurs when the first transmission signal 10a is transmitted while the second reception signal 20b is being received.

Also, when the first reception signal 10b and the second transmission signal 20a are input to the first communication unit 1, the signals interfere with each other to generate the first interference signal 40. Therefore, the reception sensitivity of the first reception signal 10b is reduced. If the reception sensitivity of the first reception signal 10b is reduced, the communication status will deteriorate, such as a decrease in communication speed or a decrease in throughput. In the illustrated embodiment, the interference relative to the first reception signal 10b (the interference in the first interference signal 40) occurs because the communications by the first communication unit 1 and the second communication unit 2 are performed simultaneously. In particular, in the illustrated embodiment, the interference relative to the first reception signal 10b (the interference in the first interference signal 40) occurs when the second transmission signal 20a is transmitted while the first reception signal 10b is being received.

Therefore, in the first embodiment, the first communication signal processing section 3b is configured to perform processing to suppress the interference in the first reception signal 10b. The second communication signal processing section 3e is also configured to perform processing to suppress interference in the second reception signal 20b.

Figure 7:
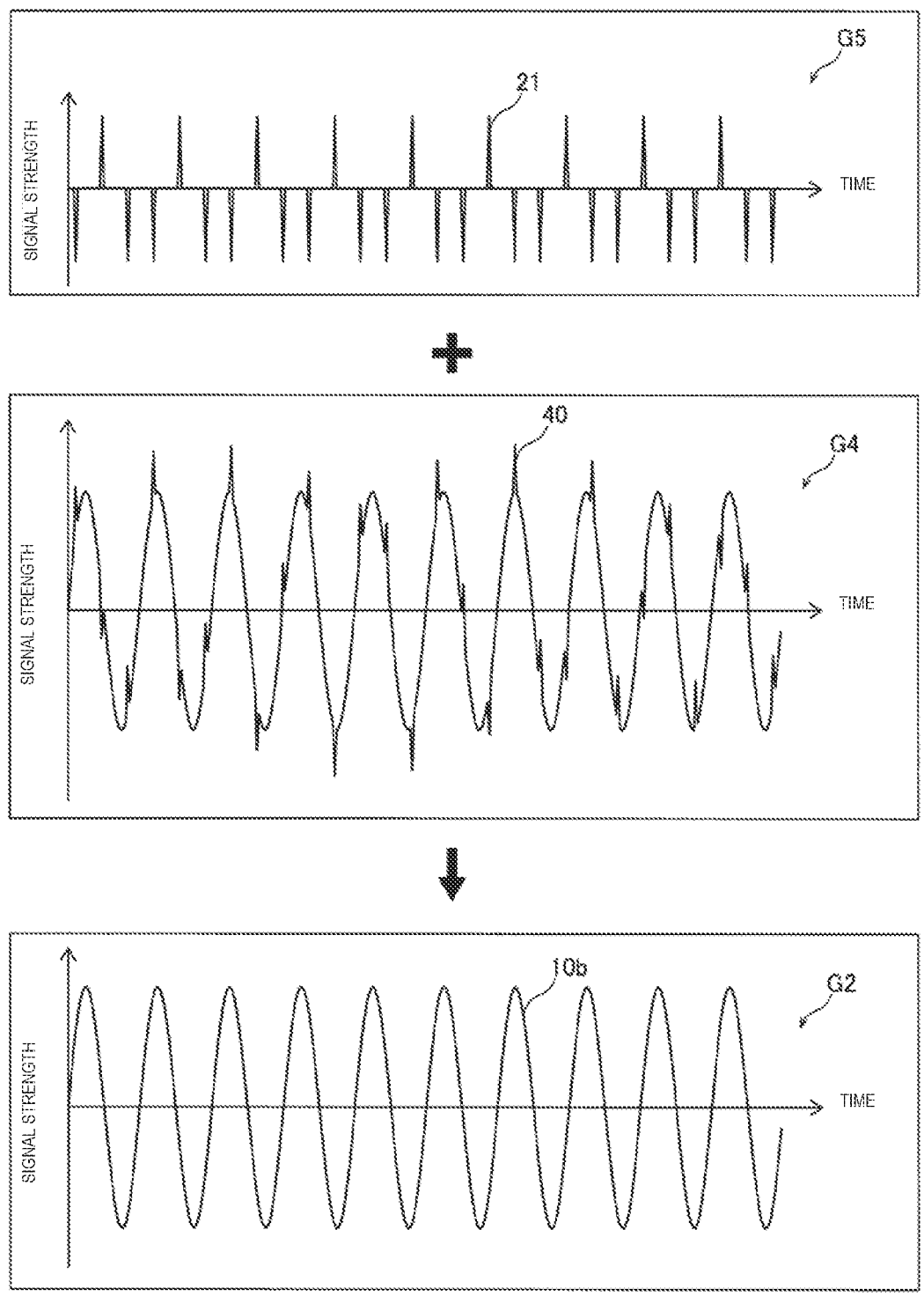
FIG. 7 is a schematic diagram illustrating a processing of removing the second communication signal from the first communication signal by a second interference suppression signal.

Specifically, as shown in FIG. 7, the first communication signal processing section 3b is configured to suppress the interference in the first reception signal 10b by inputting the second interference suppression signal 21 having the inverse characteristics of the second transmission signal 20a to the first communication signal processing section 3b when the second communication unit 2 transmits the second transmission signal 20a. Here, a graph G5 shown in FIG. 7 is a graph of the second interference suppression signal 21. In the graph G5 is a graph in which the horizontal axis represents time and the vertical axis represents the signal strength.

As shown in FIG. 7, when the second interference suppression signal 21 having the inverse characteristics of the second transmission signal 20a is added to the first interference signal 40, the signal component of the second transmission signal 20a is removed from the first interference signal 40 and the first reception signal 10b is extracted. Therefore, the reduction of the reception sensitivity of the first reception signal 10b is suppressed.

Figure 8:
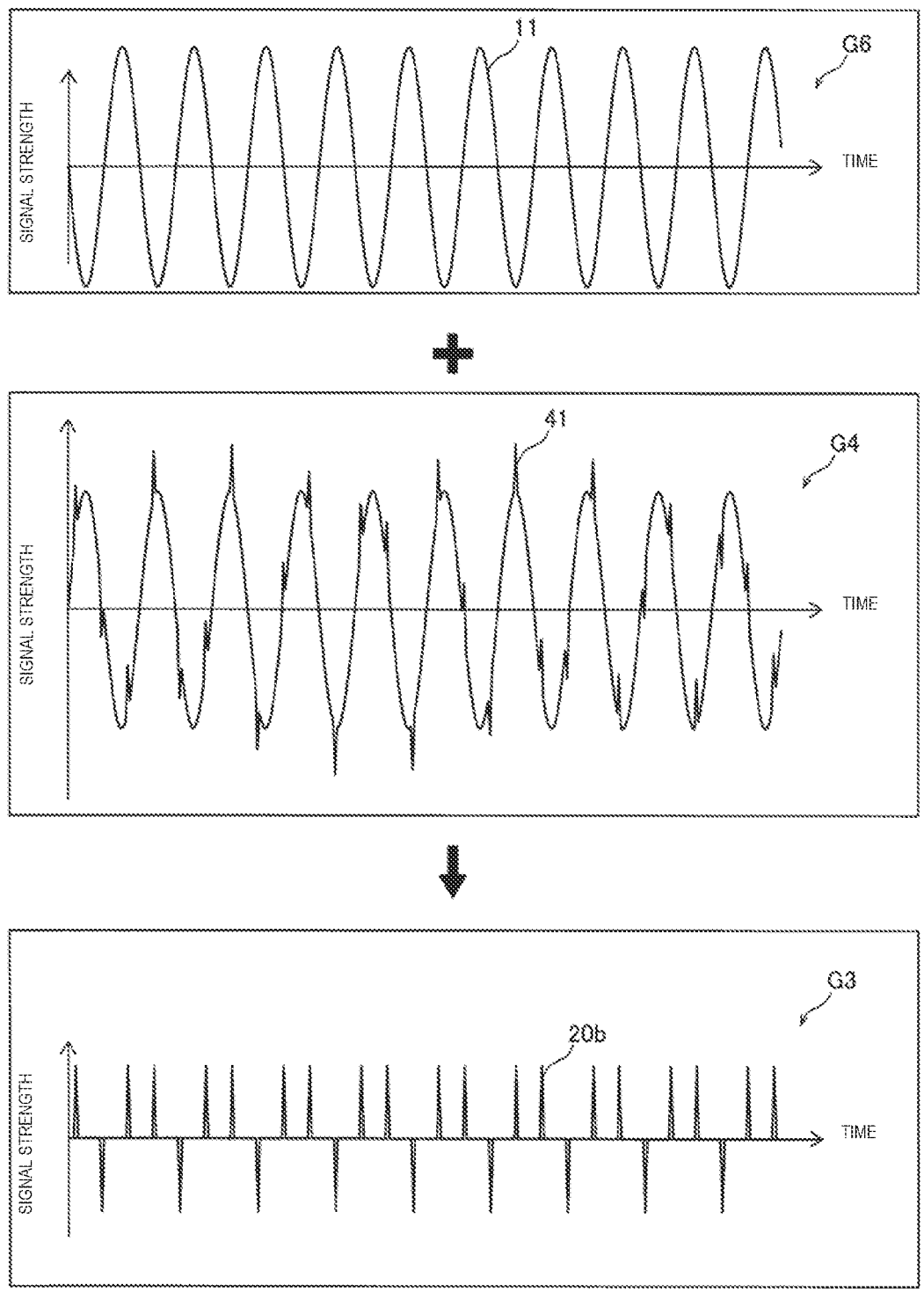
FIG. 8 is a schematic diagram illustrating a processing of removing the first communication signal from the second communication signal by a first interference suppression signal.

Furthermore, as shown in FIG. 8, the second communication signal processing section 3e is configured to input the first interference suppression signal 11 having the inverse characteristics of the first transmission signal 10a to the second communication signal processing section 3e when the first communication unit 1 transmits the first transmission signal 10a. When the first interference suppression signal 11 having the inverse characteristics of the first communication signal 10 is added to the second interference signal 41, the signal component of the first transmission signal 10a is removed from the second interference signal 41 and the second reception signal 20b is extracted. Therefore, the reduction of the reception sensitivity of the second reception signal 20b is suppressed.

(Generation of Interference Suppression Signals)

In the first embodiment, the second interference suppression signal generation section 3f is configured to acquire phase information 23 and amplitude information 24 of the second transmission signal 20a from the second communication signal generation section 3d. The second interference suppression signal generation section 3f is configured to generate the second interference suppression signal 21 having the inverse characteristics of the second transmission signal 20a based on the phase information 23 and the amplitude information 24 of the second transmission signal 20a that have been acquired. For example, the second interference suppression signal generation section 3f generates the second interference suppression signal 21 such that the second interference suppression signal 21 has the same amplitude as the second transmission signal 20a but has the inverted phase to the second transmission signal 20a.

The first interference suppression signal generation section 3c is also configured to acquire phase information 13 and amplitude information 14 of the first transmission signal 10a from the first communication signal generation section 3a. The first interference suppression signal generation section 3c is configured to generate the first interference suppression signal 11 having the inverse characteristics of the first transmission signal 10a based on the phase information 13 and the amplitude information 14 of the first transmission signal 10a that have been acquired. For example, the first interference suppression signal generation section 3c generates the first interference suppression signal 11 such that the first interference suppression signal 11 has the same amplitude as the first transmission signal 10a but has the inverted phase to the first transmission signal 10a.

In the first embodiment, the control unit 3 is configured to generate the first transmission signal 10a and the second transmission signal 20a as analog signals. The control unit 3 is also configured to generate the first interference suppression signal 11 and the second interference suppression signal 21 based on the first transmission signal 10a and the second transmission signal 20a that have been generated. The control unit 3 is also configured to perform a control for suppressing the interferences in the first reception signal 10b and the second reception signal 20b based on the first interference suppression signal 11 and the second interference suppression signal 21 that have been generated.

(Interference Suppression Processing)

Figure 9:
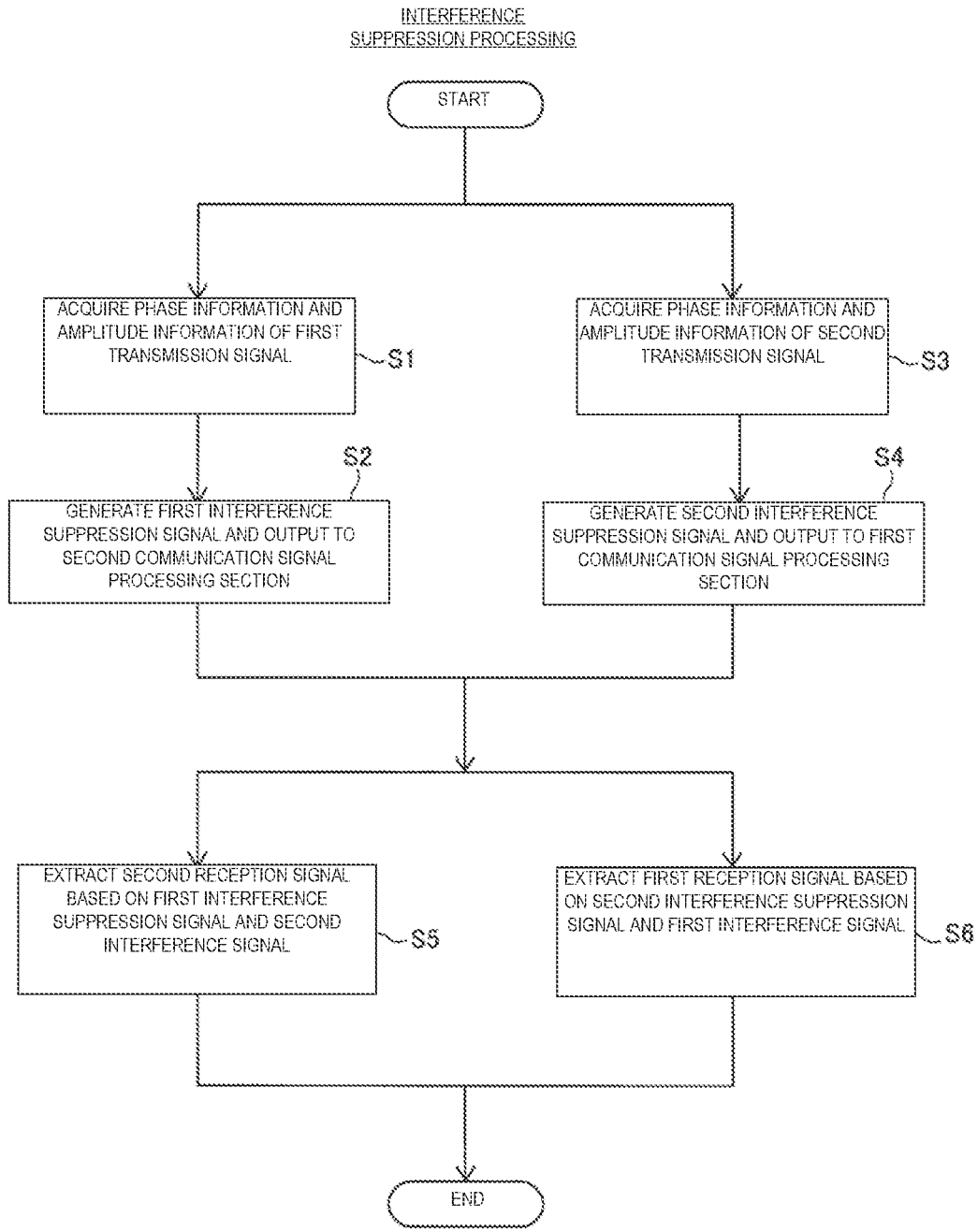
FIG. 9 is a flowchart illustrating a processing of suppressing interference ("interference suppression processing") by a control unit of the first embodiment.

Next, referring to FIG. 9, a processing by which the control unit 3 according to the first embodiment suppresses the interferences in the communication signals will be described.

In step S1, the first interference suppression signal generation section 3c acquires the phase information 13 and the amplitude information 14 of the first transmission signal 10a.

In step S2, the first interference suppression signal generation section 3c generates the first interference suppression signal 11 based on the phase information 13 and amplitude information 14 of the first transmission signal 10a that have been acquired. The first interference suppression signal generation section 3c also outputs the first interference suppression signal 11 that has been generated to the second communication signal processing section 3e.

In step S3, the second interference suppression signal generation section 3f acquires the phase information 23 and the amplitude information 24 of the second transmission signal 20a.

In step S4, the second interference suppression signal generation section 3f generates the second interference suppression signal 21 based on the phase information 23 and the amplitude information 24 of the second transmission signal 20a that have been acquired. The second interference suppression signal generation section 3f outputs the second interference suppression signal 21 that has been generated to the first communication signal processing section 3b. That is, the control unit 3 executes the processing of steps S1 and S2 by the first interference suppression signal generation section 3c and the processing of steps S3 and S4 by the second interference suppression signal generation section 3f as a parallel processing. Here, in the illustrated embodiment, the parallel processing or parallel computing is a method of concurrently executing multiple processes, in which one process runs while the other process is running. In the illustrated embodiment, the control unit 3 can be formed by a single microcontroller with a processor having a single- or multi-core or with multi-processor on a single chip or package.

In step S5, the second communication signal processing section 3e extracts the second communication signal 20 from the second interference signal 41 based on the first interference suppression signal 11 output from the first interference suppression signal generation section 3c and the second interference signal 41. In particular, the second communication signal processing section 3e extracts the second reception signal 20b from the second interference signal 41 by adding the first interference suppression signal 11 to the second interference signal 41 such that the first interference suppression signal 11 cancels out the signal component of the first transmission signal 10a in the second interference signal 41.

In step S6, the first communication signal processing section 3b extracts the first communication signal 10 from the first interference signal 40 based on the second interference suppression signal 21 output from the second interference suppression signal generation section 3f and the first interference signal 40. In particular, the first communication signal processing section 3b extracts the first reception signal 10b from the first interference signal 40 by adding the second interference suppression signal 21 to the first interference signal 40 such that the second interference suppression signal 21 cancels out the signal component of the second transmission signal 20a in the first interference signal 40. In the illustrated embodiment, the control unit 3 executes the processing of step S5 by the second communication signal processing section 3e and the processing of step S6 by the first communication signal processing section 3b as a parallel processing. The processing then ends. Here, if there is no interference in the first reception signal 10b, the processing of steps S3, S4 and S6 need not be performed. Also, if there is no interference in the second reception signal 20b, the processing of steps S1, S2 and S5 need not be performed.

(Effect of First Embodiment)

In the first embodiment, the following effects can be achieved.

In the first embodiment, as described above, the wireless communication device 100 comprises the first communication unit 1 configured to communicate wirelessly by the first communication signal 10 according to the first communication standard, and the second communication unit 2 configured to communicate wirelessly by the second communication signal 20 whose frequency band overlaps with that of the first communication signal 10 according to the second communication standard that is different from the first communication standard, and the single control unit 3 configured to generate the first interference suppression signal 11 for suppressing the interference caused by the first communication signal 10 in the second communication signal 20 and the second interference suppression signal 21 for suppressing the interference caused by the second communication signal 20 in the first communication signal 10, and perform the control for suppressing the interference in the first communication signal 10 and the interference in the second communication signal 20 based on the first interference suppression signal 11 and the second interference suppression signal 21 that have been generated. This allows the first interference suppression signal 11 to suppress the interference in the second reception signal 20b, and allows the second interference suppression signal 21 to suppress the interference in the first reception signal 10b. As a result, even when communication is performed using signals with frequency bands that overlap with each other, it is possible to suppress the reduction of the reception sensitivity in each communication by suppressing the interference caused by each signal in each communication. Since the single control unit 3 can suppress the interference in each communication signal, an increase in the number of parts and complexity of the configuration can be suppressed compared to, for example, a configuration with multiple control units 3 for generating interference suppression signals for communication signals, respectively.

In the first embodiment, as described above, the control unit 3 is configured to suppress the interferences in the first reception signal 10b and the second reception signal 20b by inputting the first interference suppression signal 11 having the inverse characteristics of the first transmission signal 10a to the second communication unit 2 when the first communication unit 1 communicates, and by inputting the second interference suppression signal 21 having the inverse characteristics of the second transmission signal 20a to the first communication unit 1 when the second communication unit 2 communicates. With this configuration, the signal component of the first transmission signal 10a is cancelled by the first interference suppression signal 11 having the inverse characteristics of the first transmission signal 10a. Therefore, even when both the first transmission signal 10a and the second reception signal 20b are input to the second communication unit 2, the first transmission signal 10a is canceled out, and thus the interference in the second reception signal 20b can be easily suppressed. Furthermore, the signal component of the second transmission signal 20a is cancelled by the second interference suppression signal 21 having the inverse characteristics of the second transmission signal 20a. Therefore, even when both the first reception signal 10b and the second transmission signal 20a are input to the first communication unit 1, the second transmission signal 20a is canceled out, and thus the interference in the first reception signal 10b can be easily suppressed. As a result, the reduction of the reception sensitivity in each communication can be easily suppressed.

In the first embodiment, as described above, the control unit 3 is configured to generate the first transmission signal 10a and the second transmission signal 20a, generate the first interference suppression signal 11 having the inverse characteristic based on the phase information 13 and the amplitude information 14 of the first transmission signal 10a that has been generated, and generate the second interference suppression signal 21 having the inverse characteristic based on the phase information 23 and the amplitude information 24 of the second transmission signal 20a that has been generated. With this configuration, the control unit 3 generates the interference suppression signal based on the phase information and the amplitude information used to generate the signal transmitted by each communication unit, and thus can easily generate the interference suppression signal having the inverse characteristics of the signal component that is actually input to the communication unit and causes the interference. As a result, the interference in each communication signal can be easily suppressed.

In the first embodiment, as described above, the control unit 3 is configured to generate the first transmission signal 10a and the second transmission signal 20a as analog signals, generate the first interference suppression signal 11 and the second interference suppression signal 21 based on the first transmission signal 10a and the second transmission signal 20a that have been generated, and perform the control for suppressing the interferences in the first reception signal 10b and the second reception signal 20b based on the first interference suppression signal 11 and the second interference suppression signal 21 that have been generated. With this configuration, the first interference suppression signal 11 and the second interference suppression signal 21 may be generated as analog signals, and it is possible to easily generate the first interference suppression signal 11 and the second interference suppression signal 21 as analog signals by acquiring the phase information and the amplitude information of each of the first transmission signal 10a and the second transmission signal 20a.

Second Embodiment

Figure 10:
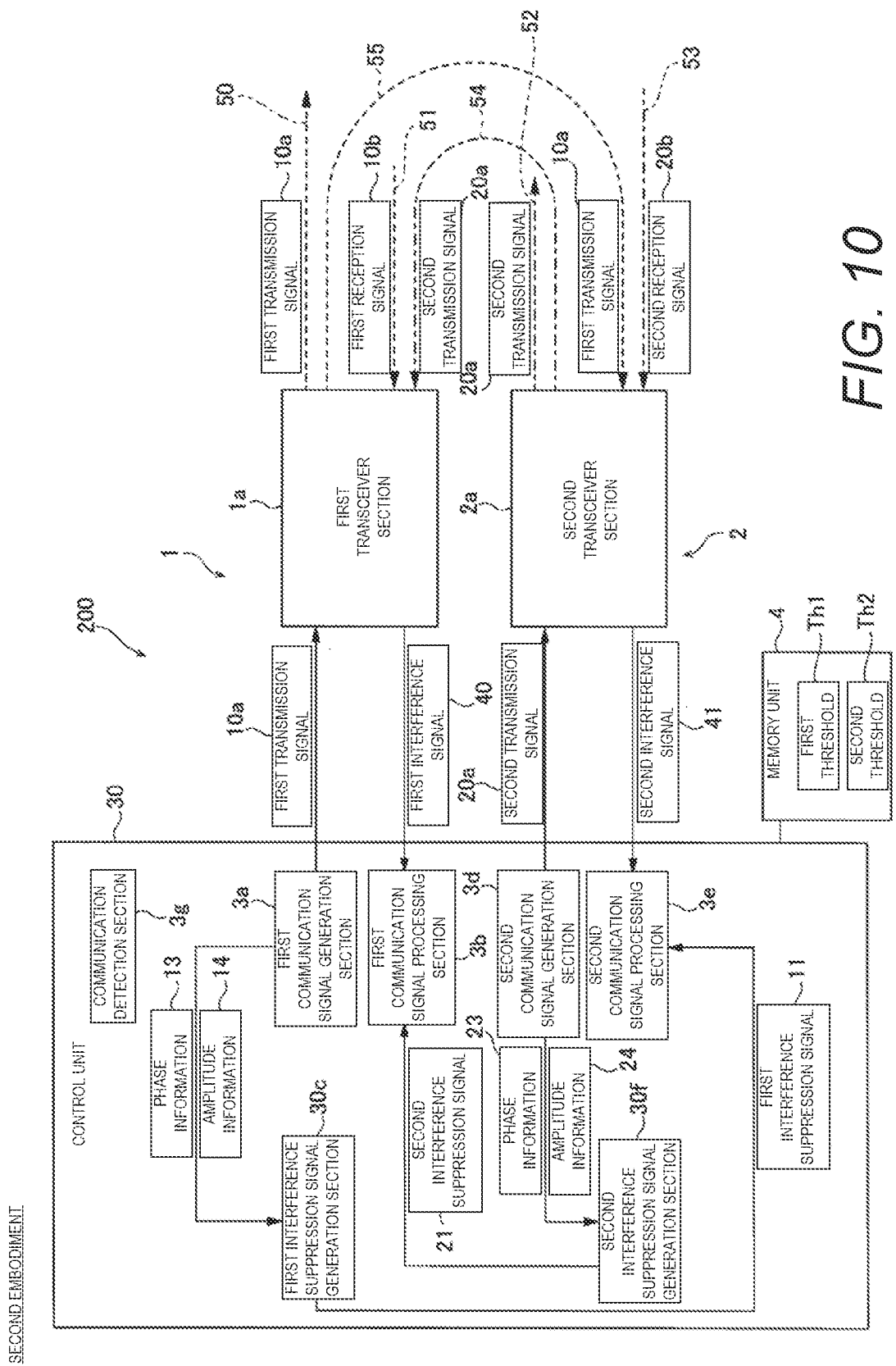
FIG. 10 is a block diagram showing the overall configuration of a wireless communication device according to a second embodiment.
Figure 11:
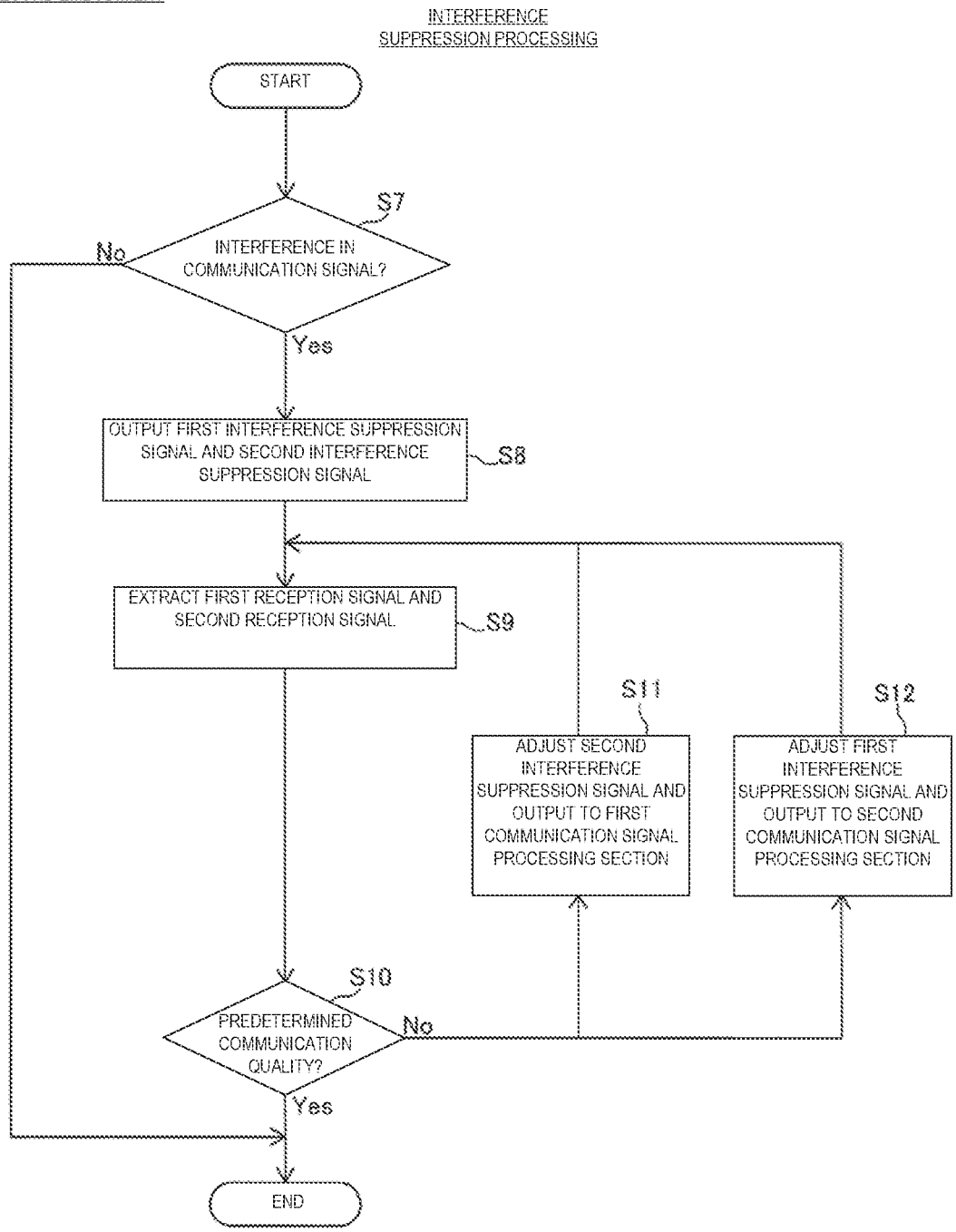
FIG. 11 is a flowchart illustrating a processing of suppressing interference ("interference suppression processing") by a control unit of the second embodiment.

Referring to FIGS. 10 and 11, a second embodiment will be described. In this second embodiment, unlike the configuration of the first embodiment, which generates the first interference suppression signal 11 and the second interference suppression signal 21 regardless of the communication status of the first communication unit 1 and the second communication unit 2, an example of a configuration will be described that generates the first interference suppression signal 11 and the second interference suppression signal 21 based on the communication status of the first communication unit 1 and the communication status of the second communication unit 2. In the drawings, the same sign is appended to the part of the configuration similar to the first embodiment above.

As shown in FIG. 10, a wireless communication device 200 according to the second embodiment differs from the wireless communication device 100 according to the first embodiment above in that the wireless communication device 200 comprises a control unit 30 instead of the control unit 3.

Specifically, the control unit 30 differs from the control unit 3 according to the first embodiment above in that the control unit 30 comprises a communication detection section 3g, a first interference suppression signal generation section 30c, and a second interference suppression signal generation section 30f. The control unit 30 functions as the communication detection section 3g, the first interference suppression signal generation section 30c, and the second interference suppression signal generation section 30f by executing a program stored in the memory unit 4.

The communication detection section 3g is configured to detect the communication status of the first communication signal 10 (the communication status of communication according to the first communication standard). The communication detection section 3g is also configured to detect the communication status of the second communication signal 20 (the communication status of communication according to the second communication standard). Specifically, the communication detection section 3g is configured to detect the communication status by detecting the communication speed of the first communication signal 10 and the second communication signal 20. The communication status is an indicator based on the communication speed and the throughput of the communication signal. In the second embodiment, the communication detection section 3g is configured to detect the communication status by the magnitude of the communication speed. For example, the communication detection section 3g monitors the operational status of the first communication signal generation section 3a and the first communication signal processing section 3b to detect the communication speed or throughput for transmitting the first transmission signal 10a and/or for receiving the first reception signal 10b. Also, the communication detection section 3g monitors the operational status of the second communication signal generation section 3d and the second communication signal processing section 3e to detect the communication speed or throughput for transmitting the second transmission signal 20a and/or for receiving the second reception signal 20b.

The first interference suppression signal generation section 30c is configured to perform a control for suppressing the interference in the first reception signal 10b based on the communication status by the first communication unit 1. Specifically, the first interference suppression signal generation section 30c is configured to perform the control for suppressing the interference in the first reception signal 10b based on a first threshold Th1 that has been set in advance with respect to the communication quality including at least the communication speed and stored in the memory unit 4 and the communication status by the first communication unit 1. The first threshold Th1 is, for example, a minimum speed, a recommended speed, or a value thereof with a margin in the first communication standard. In the second embodiment, the first threshold Th1 is, for example, a value of the recommended speed of a predetermined application with a margin when the wireless communication device 100 communicates in the predetermined application in the first communication standard. The first threshold Th1 is, for example, 5.0 Mb/s (megabits per second), or a value of 5.0 Mb/s with a margin when the first communication standard is IEEE 802.11ac, the application used is YouTube (registered trademark), and the resolution of the video to be viewed (received) is HD (High Definition) at 1080P. Here, the first threshold Th1 is stored in the memory unit 4. The first threshold Th1 is an example of a "threshold" of the present disclosure.

The second interference suppression signal generation section 30f is also configured to perform a control for suppressing the interference in the second reception signal 20b based on the communication status by the second communication unit 2. Specifically, the second interference suppression signal generation section 30f is configured to perform the control for suppressing the interference in the second reception signal 20b based on a second threshold Th2 and the communication status by the second communication unit 2. The second threshold Th2 is, for example, a value of the recommended speed for devices communicating according to the second communication standard with a margin. When the recommended speed for devices communicating in the second communication standard is, for example, 0.5 Mb/s, the second threshold Th2 is, for example, 0.5 Mb/s, or a value of 0.5 Mb/s with a margin. Here, the second threshold Th2 is stored in the memory unit 4. The second threshold Th2 is an example of a "threshold" of the present disclosure.

Next, referring to FIG. 11, a processing by which the control unit 30 according to the second embodiment suppresses the interference will be described. The same sign is used with respect to the same processing as that of the control unit 3 according to the first embodiment described above, and a detailed explanation will be omitted.

In step S7, the communication detection section 3g determines whether or not there is interference in the first reception signal 10b. Specifically, the communication detection section 3g determines that there is interference in the first reception signal 10b if the communication speed in the communication by the first communication signal 10 is below the first threshold Th1. The communication detection section 3g determines that there is no interference in the first reception signal 10b if the communication speed in the communication by the first communication signal 10 is greater than or equal to the first threshold Th1.

The communication detection section 3g also determines whether or not there is interference in the second reception signal 20b. Specifically, the communication detection section 3g determines that there is interference in the second reception signal 20b if the communication speed in the communication by the second communication signal 20 is below the second threshold Th2. The communication detection section 3g determines that there is no interference in the second reception signal 20b if the communication speed in the communication by the second communication signal 20 is greater than or equal to the second threshold Th2. If there is interference in any one or both of the first reception signal 10b and the second reception signal 20b, then the processing proceeds to step S8. If there is no interference in either of the first reception signal 10b and the second reception signal 20b (i.e., no interference in the first reception signal 10b and no interference in the second reception signal 20b), then the processing ends.

In step S8, the first interference suppression signal generation section 30c and the second interference suppression signal generation section 30f generate the first interference suppression signal 11 and the second interference suppression signal 21, respectively, and output them to the second communication signal processing section 3e and the first communication signal processing section 3b, respectively. Since the processing in step S8 is the same as the processing in steps S1 to S4 in the first embodiment described above, a detailed explanation is omitted.

Next, in step S9, the first communication signal processing section 3b and the second communication signal processing section 3e extract the first reception signal 10b and the second reception signal 20b, respectively. Since the processing in step S9 is the same as the processing in steps S5 and S6 in the first embodiment described above, a detailed explanation is omitted.

Next, in step S10, the communication detection section 3g determines whether the communication quality of the first communication signal 10 is a predetermined communication quality or not. Specifically, the communication detection section 3g determines that the communication quality is not the predetermined communication quality when the communication speed of the first communication signal 10 is below the first threshold Th1. The communication detection section 3g determines that the communication quality of the first communication signal 10 is the predetermined communication quality when the communication speed of the first communication signal 10 is greater than or equal to the first threshold Th1.

The communication detection section 3g also determines whether the communication quality of the second communication signal 20 is a predetermined communication quality or not. Specifically, the communication detection section 3g determines that the communication quality is not the predetermined communication quality when the communication speed of the second communication signal 20 is below the second threshold Th2. The communication detection section 3g determines that the communication quality of the second communication signal 20 is the predetermined communication quality when the communication speed of the second communication signal 20 is greater than or equal to the second threshold Th2. If any one or both of the communication qualities of the first communication signal 10 and the second communication signal 20 are not the predetermined communication quality, then the processing proceeds to steps S11 and S12. If both of the communication qualities are the predetermined communication quality, then the processing ends. The communication quality is an index based on the communication speed, the throughput, and the error rate of the communication signal. In the second embodiment, the communication detection section 3g is configured to determine the communication quality based on the communication speed of the communication signals.

In step S11, the second interference suppression signal generation section 30f adjusts the second interference suppression signal 21. Specifically, the second interference suppression signal generation section 30f adjusts the second interference suppression signal 21 by adjusting the phase and/or the amplitude of the second interference suppression signal 21. For example, the second interference suppression signal generation section 30f adjusts the second interference suppression signal 21 by changing the phase and/or the amplitude of the second interference suppression signal 21 by a predetermined value. Then, the second interference suppression signal generation section 30f outputs the second interference suppression signal 21 to the first communication signal processing section 3b.

In step S12, the first interference suppression signal generation section 30c adjusts the first interference suppression signal 11. Specifically, the first interference suppression signal generation section 30c adjusts the first interference suppression signal 11 by adjusting the phase and/or the amplitude of the first interference suppression signal 11. For example, the first interference suppression signal generation section 30c adjusts the first interference suppression signal 11 by changing the phase and/or the amplitude of the first interference suppression signal 11 by a predetermined value. Then, the first interference suppression signal generation section 30c outputs the first interference suppression signal 11 to the second communication signal processing section 3e. As shown in FIG. 11, the processing of step S12 by the first interference suppression signal generation section 30c and the processing of step S11 by the second interference suppression signal generation section 30f are executed as a parallel processing. The processing then proceeds to step S9. In step S9, the first communication signal processing section 3b and the second communication signal processing section 3e again extract the first reception signal 10b and the second reception signal 20b, respectively, based on the adjusted first interference suppression signal 11 and the adjusted second interference suppression signal 21, respectively. Then, the processing proceeds to step S10. The processing of steps S11, S12, S9 and S10 is repeatedly performed until both of the communication qualities of the first communication signal 10 and the second communication signal 20 satisfy the predetermined communication quality in step S10.

If there is no interference in the first communication signal 10, the processing of step S11 need not be performed. If there is no interference in the second communication signal 20, the processing of step S12 need not be performed.

Other configurations of the wireless communication device 200 according to the second embodiment are the same as in the first embodiment above.

(Effect of Second Embodiment)

In the second embodiment, as described above, the control unit 30 is configured to perform the control for suppressing the interference in the first reception signal 10b based on the communication status by the first communication unit 1, and perform the control for suppressing the interference in the second reception signal 20b based on the communication status by the second communication unit 2. With this configuration, by performing the control for suppressing the interference based on the communication status by each communication unit, the processing for suppressing the interference can be performed only on the communication unit whose reception sensitivity has been reduced. As a result, the frequency of generating the interference suppression signals can be reduced compared to a configuration that always performs an interference suppression processing regardless of the communication environment, and thus the load on the control unit 30 can be reduced.

In the second embodiment, as described above, the control unit 30 is configured to perform the control for suppressing the interference in the first reception signal 10b based on the first threshold Th1 that has been set in advance with respect to the communication quality including at least the communication speed and stored in the memory unit 4 and the communication status by the first communication unit 1, and perform the control for suppressing the interference in the second reception signal 20b based on the second threshold Th2 and the communication status by the second communication unit 2. With this configuration, the frequency of generating the first interference suppression signal 11 and the second interference suppression signal 21 can be further reduced because the processing for suppressing the interference is performed based on the communication status and the communication quality. As a result, the load on the control unit 30 can be further reduced.

The other effects of the second embodiment are the same as in the first embodiment above.

Third Embodiment

Figure 12:
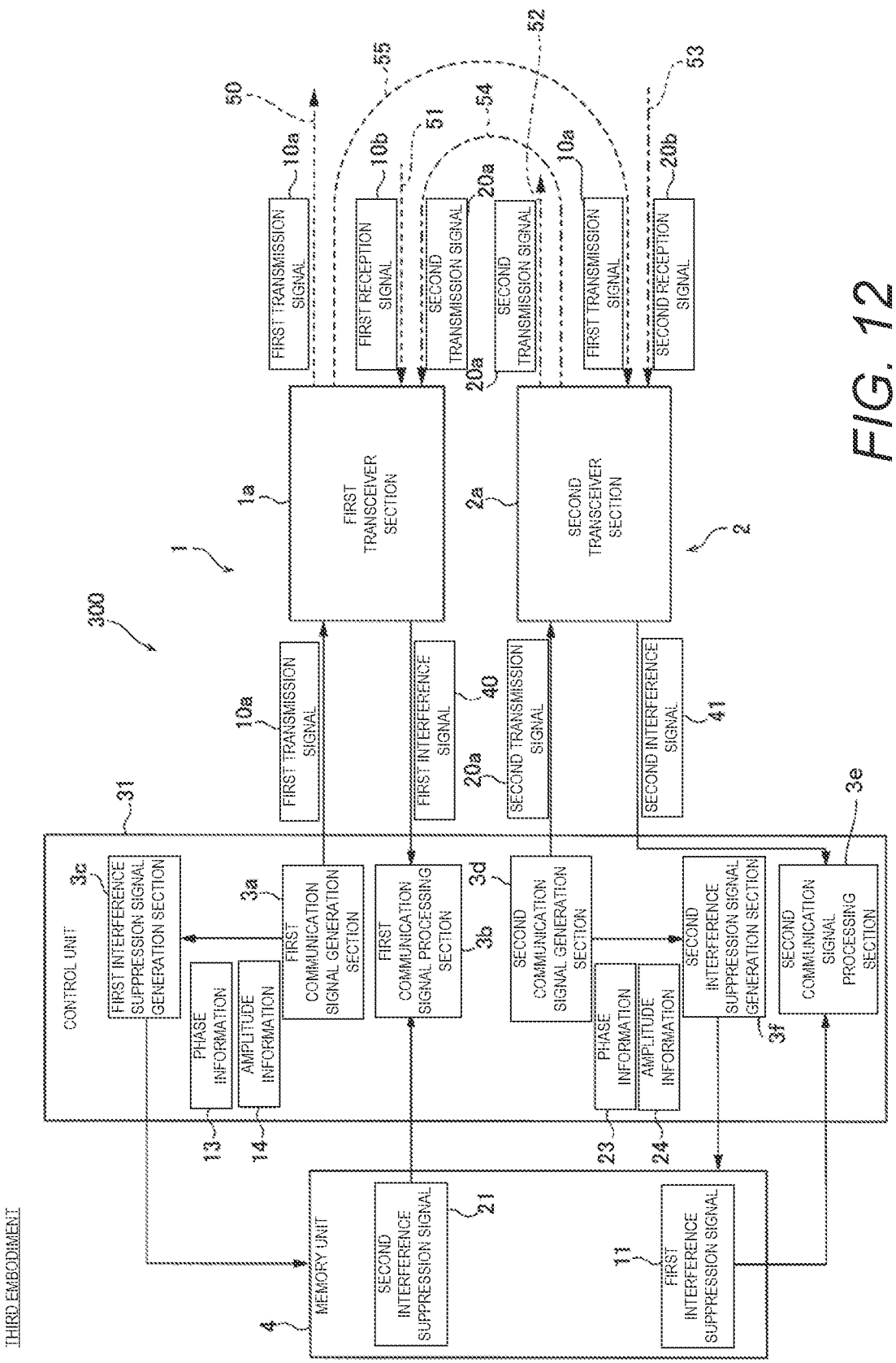
FIG. 12 is a block diagram showing the overall configuration of a wireless communication device according to a third embodiment.
Figure 13:
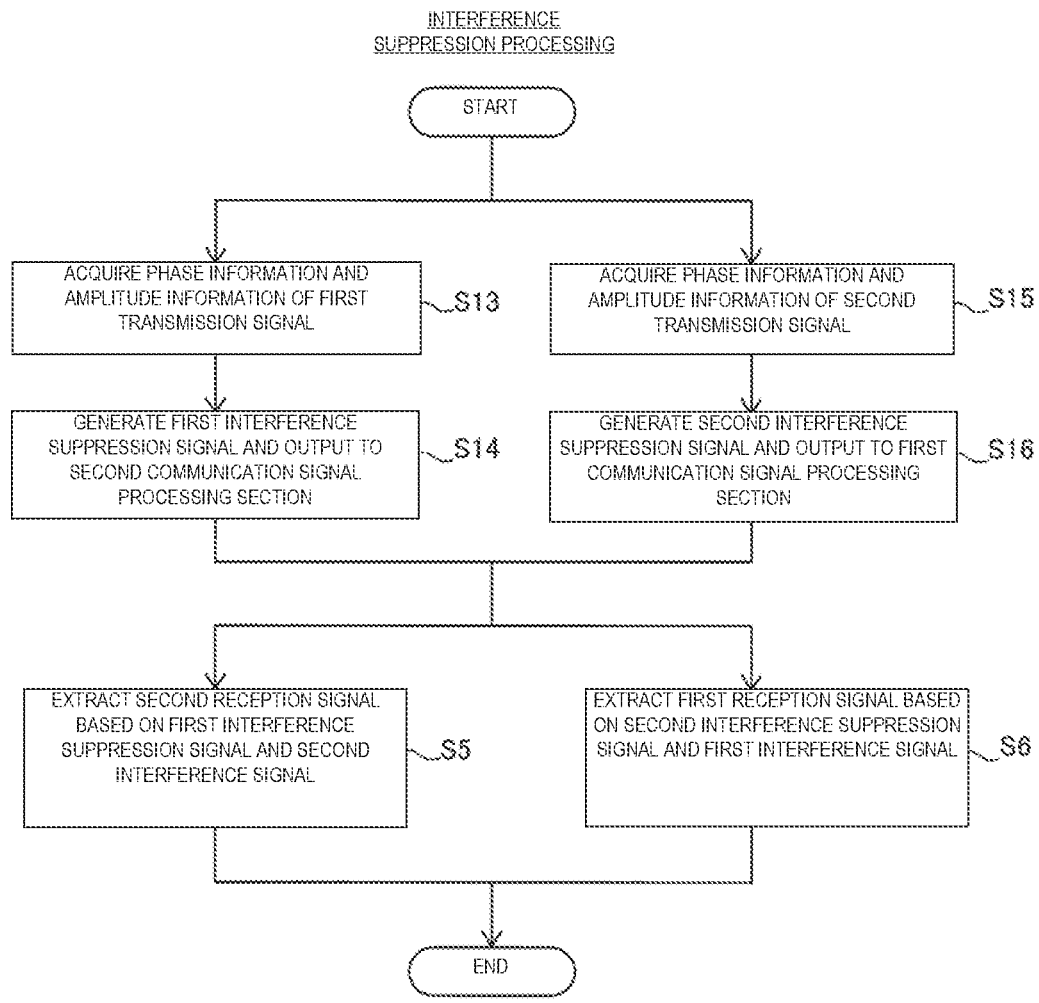
FIG. 13 is a flowchart illustrating a processing of suppressing interference ("interference suppression processing") by a control unit of the third embodiment.

Referring to FIGS. 12 and 13, a third embodiment will be described. A wireless communication device 300 in this third embodiment differs from the wireless communication device 100 according to the first embodiment in that the wireless communication device 300 stores the phase information 13 and the amplitude information 14 of the first transmission signal 10a and the phase information 23 and the amplitude information 24 of the second transmission signal 20a in the memory unit 4, generates the first interference suppression signal 11 and the second interference suppression signal 21 based on the phase information 13 and the amplitude information 14 of the first transmission signal 10a and the phase information 23 and the amplitude information 24 of the second transmission signal 20a that have been stored in the memory unit 4, and suppresses the interferences of the first communication signal 10 and the second communication signal 20. In the drawings, the same sign is appended to the part of the configuration similar to the first embodiment above.

As shown in FIG. 12, the wireless communication device 300 according to the third embodiment differs from the wireless communication device 100 according to the first embodiment above in that the wireless communication device 300 comprises a control unit 31 instead of the control unit 3.

Specifically, the control unit 31 according to the third embodiment differs from the control unit 3 according to the first embodiment above in that the control unit 31 stores, when the first interference suppression signal 11 and the second interference suppression signal 21 are generated during calibration of the wireless communication device 300, the phase information 13 and the amplitude information 14 of the first transmission signal 10*a* and the phase information 23 and the amplitude information 24 of the second transmission signal 20*a* in the memory unit 4, and in that the control unit 31 generates the first interference suppression signal 11 and the second interference suppression signal 21 based on the phase information 13 and the amplitude information 14 of the first transmission signal 10*a* and the phase information 23 and the amplitude information 24 of the second transmission signal 20*a* that have been stored in the memory unit 4. Here, the wireless communication device 300 according to the third embodiment is a stationary-type device installed in a room or the like, for example. Since the radio wave environment (the degree of interference) does not fluctuate significantly in a room or the like, the wireless communication device 300 performs a calibration (adjustment) to generate the first interference suppression signal 11 and the second interference suppression signal 21 as part of the initial setup. The wireless communication device 300 is configured to be calibrated again if the radio environment changes and interference occurs in the reception signal.

The configuration of generating the first interference suppression signal 11 and the second interference suppression signal 21 by the wireless communication device 300 is the same as that of the wireless communication device 100 according to the first embodiment described above, and therefore a detailed description is omitted.

The control unit 31 according to the third embodiment is configured to perform a control for suppressing interferences in the first reception signal 10*b* and the second reception signal 20*b* based on the first interference suppression signal 11 and the second interference suppression signal 21 that have been generated.

Next, referring to FIG. 13, the processing by which the control unit 31 according to the third embodiment suppresses the interference will be described. The same sign is used with respect to the same processing as that of the control unit 3 according to the first embodiment described above, and a detailed description will be omitted.

In step S13, the first interference suppression signal generation section 3*c* acquires the phase information 13 and the amplitude information 14 of the first transmission signal 10*a* that have been stored in the memory unit 4 during the calibration.

In step S14, the first interference suppression signal generation section 3*c* generates the first interference suppression signal 11 based on the phase information 13 and the amplitude information 14 of the first transmission signal 10*a* that have been acquired. The first interference suppression signal generation section 3*c* outputs the first interference suppression signal 11 that has been generated to the second communication signal processing section 3*e*. For example, as shown in FIG. 12, the first interference suppression signal generation section 3*c* can generate and store the first interference suppression signal 11 in the memory unit 4 during the calibration, and output the first interference suppression signal 11 to the second communication signal processing section 3*e* via the memory unit 4.

In step S15, the second interference suppression signal generation section 3*f* acquires the phase information 23 and the amplitude information 24 of the second transmission signal 20*a* that have been stored in the memory unit 4 during the calibration.

In step S16, the second interference suppression signal generation section 3*f* generates the second interference suppression signal 21 based on the phase information 23 and the amplitude information 24 of the second transmission signal 20*a* that have been acquired. The second interference suppression signal generation section 3*f* outputs the second interference suppression signal 21 that has been generated to the first communication signal processing section 3*b*. For example, as shown in FIG. 12, the second interference suppression signal generation section 3*f* can generate and store the second interference suppression signal 21 in the memory unit 4 during the calibration, and output the second interference suppression signal 21 to the first communication signal processing section 3*b* via the memory unit 4. As shown in FIG. 13, the control unit 31 executes the processing of steps S13 and S14 by the first interference suppression signal generation section 3*c* and the processing of steps S15 and S16 by the second interference suppression signal generation section 3*f* as a parallel processing.

Thereafter, the first communication signal processing section 3*b* and the second communication signal processing section 3*e* perform the processing of step S5 and step S6 to perform the processing for suppressing the interference of the first reception signal 10*b* and the second reception signal 20*b*. The processing then ends. Here, whichever of the processing of steps S5 and S6 may be performed first.

Other configurations of the wireless communication device 300 according to the third embodiment are the same as in the first embodiment above.

(Effect of Third Embodiment)

In the third embodiment, as described above, the memory unit 4 is further provided, and when the control unit 31 is configured to store, when the first interference suppression signal 11 and the second interference suppression signal 21 are generated during calibration, the phase information 13 and the amplitude information 14 of the first transmission signal 10*a* and the phase information 23 and the amplitude information 24 of the second transmission signal 20*a* in the memory unit 4, generate the first interference suppression signal 11 and the second interference suppression signal 21 based on the phase information 13 and the amplitude information 14 of the first transmission signal 10*a* and the phase information 23 and the amplitude information 24 of the second transmission signal 20*a* that have been stored in the memory unit 4, and perform the control for suppressing the interferences in the first reception signal 10*b* and the second reception signal 20*b*. With this configuration, by generating the first interference suppression signal 11 and the second interference suppression signal 21 based on the phase information 13 and the amplitude information 14 of the first transmission signal 10*a* and the phase information 23 and the amplitude information 24 of the second transmission signal 20*a* that have been stored in the memory unit 4, the interferences in the first reception signal 10*b* and the second reception signal 20*b* can be suppressed. As a result, compared to a configuration in which the first interference suppression signal generation section 3*c*, each time communication is performed, generates the first interference suppression signal 11 by acquiring the phase information 13 and the amplitude information 14 of the first transmission signal 10*a* that is actually being transmitted and the second interference suppression signal generation section 3*f*, each time communication is performed, generates the second interference suppression signal 21 by acquiring the phase information 23 and the amplitude information 24 of the second transmission signal 20*a* that is actually being transmitted, the load on the control unit 31 can be reduced.

The other effects of the third embodiment are the same as in the first embodiment above.

Fourth Embodiment

Figure 14:
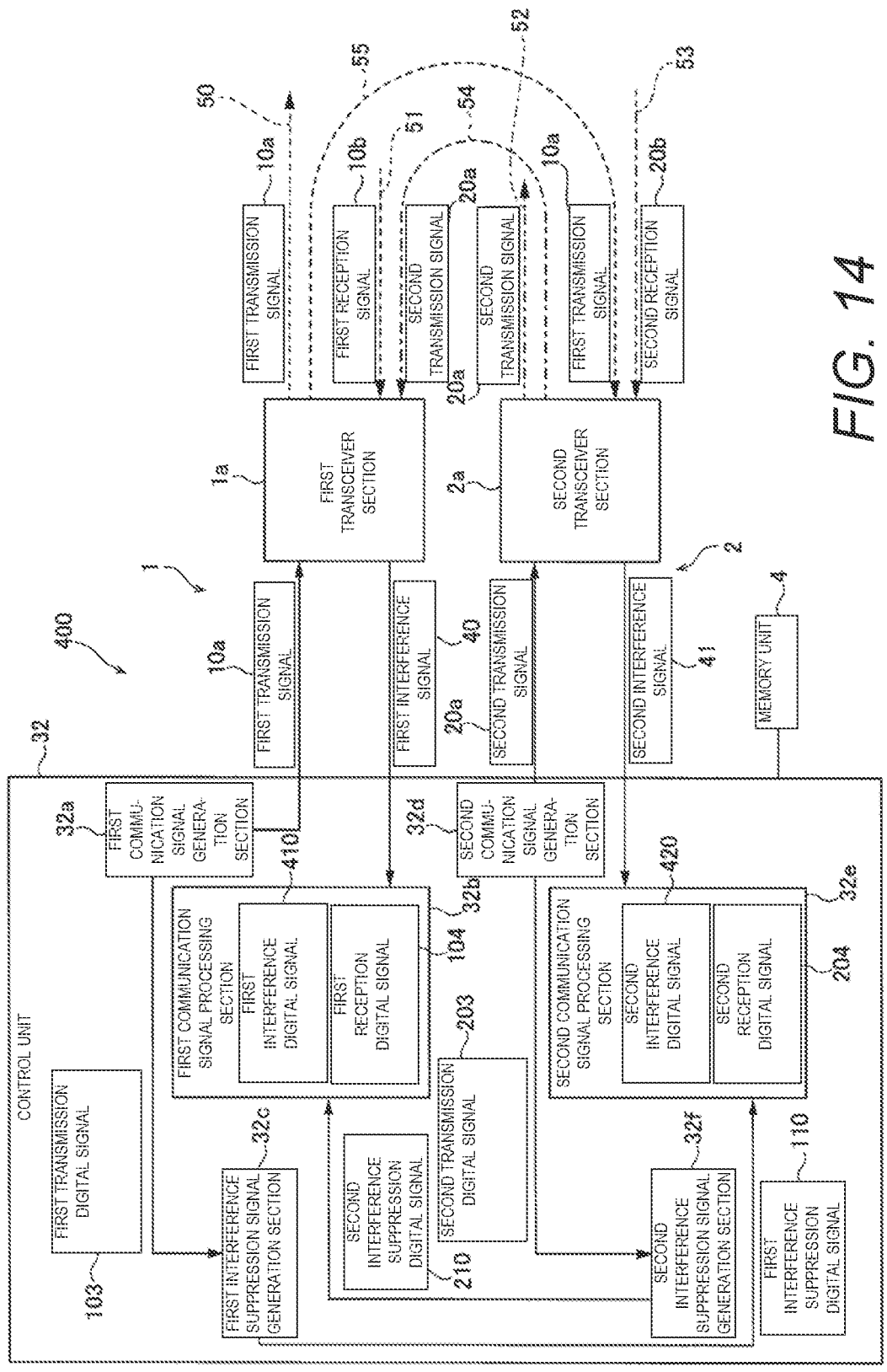
FIG. 14 is a block diagram showing the overall configuration of a wireless communication device according to a fourth embodiment.
Figure 15:
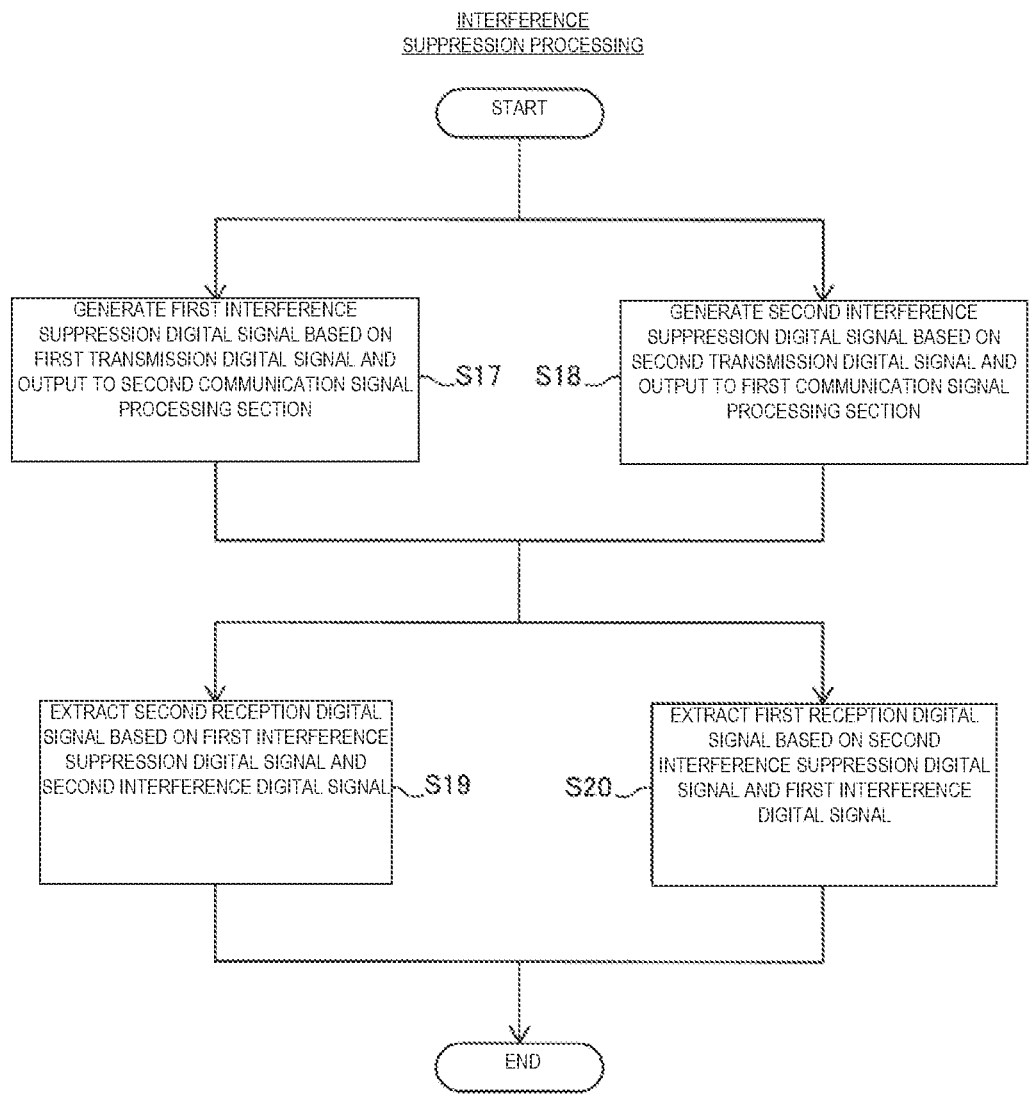
FIG. 15 is a flowchart illustrating a processing of suppressing interference ("interference suppression processing") by a control unit of the fourth embodiment.

Referring to FIGS. 14 and 15, a fourth embodiment will be described. In this fourth embodiment, unlike the wireless communication device 100 according to the first embodiment above, which performs the processing for suppressing the interference of the first communication signal 10 and the second communication signal 20, which are analog signals, a configuration for suppressing interferences of a first transmission digital signal 103 and a second transmission digital signal 203, which are digital signals, will be described. In the drawings, the same sign is appended to the part of the configuration similar to the first embodiment above. Here, the first transmission digital signal 103 and the second transmission digital signal 203 are examples of the "first communication digital signal" and the "second communication digital signal" of the present disclosure.

As shown in FIG. 14, a wireless communication device 400 according to the fourth embodiment differs from the wireless communication device 100 according to the first embodiment above in that the wireless communication device 400 comprises a control unit 32 instead of the control unit 3.

Specifically, the control unit 32 according to the fourth embodiment differs from the control unit 3 according to the first embodiment above in that the control unit 32 includes a first communication signal generation section 32a, a first communication signal processing section 32b, a first interference suppression signal generation section 32c, a second communication signal generation section 32d, a second communication signal processing section 32e, and a second interference suppression signal generation section 32f, instead of the first communication signal generation section 3a, the first communication signal processing section 3b, the first interference suppression signal generation section 3c, the second communication signal generation section 3d, the second communication signal processing section 3e, and the second interference suppression signal generation section 3f. The control unit 32 functions as the first communication signal generation section 32a, the first communication signal processing section 32b, the first interference suppression signal generation section 32c, the second communication signal generation section 32d, the second communication signal processing section 32e, and the second interference suppression signal generation section 32f by executing various programs stored in the memory unit 4.

The first communication signal generation section 32a is configured to generate the first transmission signal 10a by converting the first transmission digital signal 103 that has not been converted to an analog signal (i.e., before DA conversion processing) to an analog signal by performing the DA conversion processing. The first communication signal generation section 32a is configured to transmit the first transmission digital signal 103 to the first interference suppression signal generation section 32c.

The first communication signal processing section 32b is configured to generate a first interference digital signal 410 by converting the first interference signal 40 into a digital signal. The first communication signal processing section 32b is configured to suppress the interference of a first reception digital signal 104 based on the first interference digital signal 410 and a second interference suppression digital signal 210. That is, in the fourth embodiment, the first communication signal processing section 32b is configured to suppress the interference in the first interference digital signal 410 by adding the second interference suppression digital signal 210 to the first interference digital signal 410 that has been converted to a digital signal (i.e., after the AD conversion processing). The first reception digital signal 104 is an example of the "first communication digital signal" of the present disclosure.

The first interference suppression signal generation section 32c is configured to generate the first interference suppression digital signal 110 based on the first transmission digital signal 103. That is, in the fourth embodiment, the first interference suppression signal generation section 32c is configured to generate the first interference suppression digital signal 110 from the first transmission digital signal 103 that has not been converted to an analog signal (i.e., before the DA conversion processing). The first interference suppression signal generation section 32c is configured to output the first interference suppression digital signal 110 that has been generated to the second communication signal processing section 32e.

The second communication signal generation section 32d is configured to generate the second transmission signal 20a by converting the second transmission digital signal 203 that has not been converted to an analog signal (i.e., before DA conversion processing) to an analog signal by performing the DA conversion processing. The second communication signal generation section 32d is configured to transmit the second transmission digital signal 203 to the second interference suppression signal generation section 32f.

The second communication signal processing section 32e is configured to generate a second interference digital signal 420 by converting the second interference signal 41 into a digital signal. The second communication signal processing section 32e is configured to suppress the interference of a second reception digital signal 204 based on the second interference digital signal 420 and the first interference suppression digital signal 110. That is, in the fourth embodiment, the second communication signal processing section 32e is configured to suppress the interference in the second interference digital signal 420 by adding the first interference suppression digital signal 110 to the second interference digital signal 420 that has been converted to a digital signal (i.e., after the AD conversion processing). The second reception digital signal 204 is an example of the "second communication digital signal" of the present disclosure.

The second interference suppression signal generation section 32f is configured to generate the second interference suppression digital signal 210 based on the second transmission digital signal 203. That is, in the fourth embodiment, the second interference suppression signal generation section 32f is configured to generate the second interference suppression digital signal 210 from the second transmission digital signal 203 that has not been converted to an analog signal (i.e., before the DA conversion processing). The second interference suppression signal generation section 32f is configured to output the second interference suppression digital signal 210 that has been generated to the first communication signal processing section 32b.

Next, referring to FIG. 15, the processing by which the control unit 32 according to the fourth embodiment suppresses the interference will be described.

In step S17, the first interference suppression signal generation section 32c generates the first interference suppression digital signal 110 based on the first transmission digital signal 103. The first interference suppression signal generation section 32c outputs the first interference suppression digital signal 110 that has been generated to the second communication signal processing section 32e. For example, the first interference suppression digital signal 110 is generated as a digital signal having the inverse characteristics of the first transmission digital signal 103. In other words, the first interference suppression digital signal 110 is generated as a digital signal that cancels out the first transmission digital signal 103 when being added to the first transmission digital signal 103.

In step S18, the second interference suppression signal generation section 32f generates the second interference suppression digital signal 210 based on the second transmission digital signal 203. The second interference suppression signal generation section 32f outputs the second interference suppression digital signal 210 that has been generated to the first communication signal processing section 32b. For example, the second interference suppression digital signal 210 is generated as a digital signal having the inverse characteristics of the second transmission digital signal 203. In other words, the second interference suppression digital signal 210 is generated as a digital signal that cancels out the second transmission digital signal 203 when being added to the second transmission digital signal 203.

In step S19, the second communication signal processing section 32e extracts the second reception digital signal 204 by suppressing the interference in the second interference digital signal 420 based on the second interference digital signal 420 and the first interference suppression digital signal 110. Specifically, the second reception digital signal 204 is extracted by adding the first interference suppression digital signal 110 to the second interference digital signal 420.

In step S20, the first communication signal processing section 32b extracts the first reception digital signal 104 by suppressing the interference in the first interference digital signal 410 based on the first interference digital signal 410 and the second interference suppression digital signal 210. Specifically, the first reception digital signal 104 is extracted by adding the second interference suppression digital signal 210 to the first interference digital signal 410.

The processing then ends. Whichever of the processing of steps S17 and S18 may be performed first. Whichever of the processing of steps S19 and S20 may be performed first.

Other configurations of the wireless communication device 400 according to the fourth embodiment are the same as in the first embodiment above.

(Effect of Fourth Embodiment)

In the fourth embodiment, as described above, the control unit 32 is configured to generate the first transmission signal 10a and the second transmission signal 20a by converting the first transmission digital signal 103 and the second transmission digital signal 203 into analog signals, generate the first interference suppression digital signal 110 and the second interference suppression digital signal 210 based on the first transmission digital signal 103 and the second transmission digital signal 203, perform the control for suppressing the interferences in the first reception digital signal 104 and the second reception digital signal 204 based on the first interference suppression digital signal 110 and the second interference suppression digital signal 210 that have been generated. With this configuration, the communication signals and the interference suppression signals can be processed as digital signals, and thus the effects of noise generated during processing can be suppressed compared to a configuration in which the communication signals and the interference suppression signals are processed as analog signals. As a result, the effects caused by noise can be suppressed in the processing of suppressing the interferences in the communication signals.

The other effects of the fourth embodiment are the same as in the first embodiment above.

MODIFICATION EXAMPLE

The embodiments disclosed here are illustrative and are not restrictive in all respects. The scope of the invention is indicated by the claims rather than by the description of the embodiments described above, and furthermore includes all modifications (modification examples) within the meaning and scope of the claims and their equivalents.

For example, in the first to fourth embodiments above, examples of a configuration in which the control unit 3 (30, 31, 32) generates the first interference suppression signal 11 (the first interference suppression digital signal 110) having the inverse characteristics of the first transmission signal 10a (the first transmission digital signal 103), and generates the second interference suppression signal 21 (the second interference suppression digital signal 210) having the inverse characteristics of the second transmission signal 20a (the second transmission digital signal 203) are illustrated, but the present invention is not limited to this. In the present invention, the control unit 3 (30, 31, 32) can, for example, be configured to remove the interference signals from the first reception signal 10b and the second reception signal 20b using a combination of a plurality of first interference suppression signals (first interference suppression digital signals) that do not have the inverse characteristics of the first transmission signal 10a (the first transmission digital signal 103) and a combination of a plurality of second interference suppression signals (second interference suppression digital signals) that do not have the inverse characteristics of the second transmission signal 20a (the second transmission digital signal 203). The first interference suppression signals (the first interference suppression digital signals) may have any characteristic as long as it is possible to remove the signal component of the second communication signal 20 from the first interference signal 40. The second interference suppression signals (the second interference suppression digital signals) may have any characteristic as long as it is possible to remove the signal component of the first communication signal 10 from the second interference signal 41.

In the first to fourth embodiments above, examples of a configuration in which the control unit 3 (30, 31, 32) generates the first interference suppression signal 11 (the first interference suppression digital signal 110) based on the phase information 13 and the amplitude information 14 of the first transmission signal 10a (the first transmission digital signal 103), and generates the second interference suppression signal 21 (the second interference suppression digital signal 210) based on the phase information 23 and the amplitude information 24 of the second transmission signal 20a (the second transmission digital signal 203) are illustrated, but the present invention is not limited to this. In the present invention, for example, the control unit 3 (30, 31, 32) can be configured to generate the first interference suppression signal 11 (the first interference suppression digital signal 110) based on any of the phase information 13 and the amplitude information 14 of the first transmission signal 10a (the first transmission digital signal 103) and generate the second interference suppression signal 21 (the second interference suppression digital signal 210) based on any of the phase information 23 and the amplitude information 24 of the second transmission signal 20a (the second transmission digital signal 203). Furthermore, for example, the control unit 3 (30, 31, 32) can be configured to generate the first interference suppression signal 11 (the first interference suppression digital signal 110) based on information other than the phase information 13 and the amplitude information 14 of the first transmission signal 10a (the first transmission digital signal 103), and generate the second interference suppression signal 21 (the second interference suppression digital signal 210) based on information other than the phase information 23 and the amplitude information 24 of the second transmission signal 20a (the second transmission digital signal 203).

In the first embodiment above, an example of a configuration in which the wireless communication device 100 comprises the memory unit 4 is illustrated, but the present invention is not limited to this. When the control unit 3 performs the interference suppression processing as a parallel processing, as in the first embodiment above, the wireless communication device 100 may not be equipped with the memory unit 4.

Figure 16:
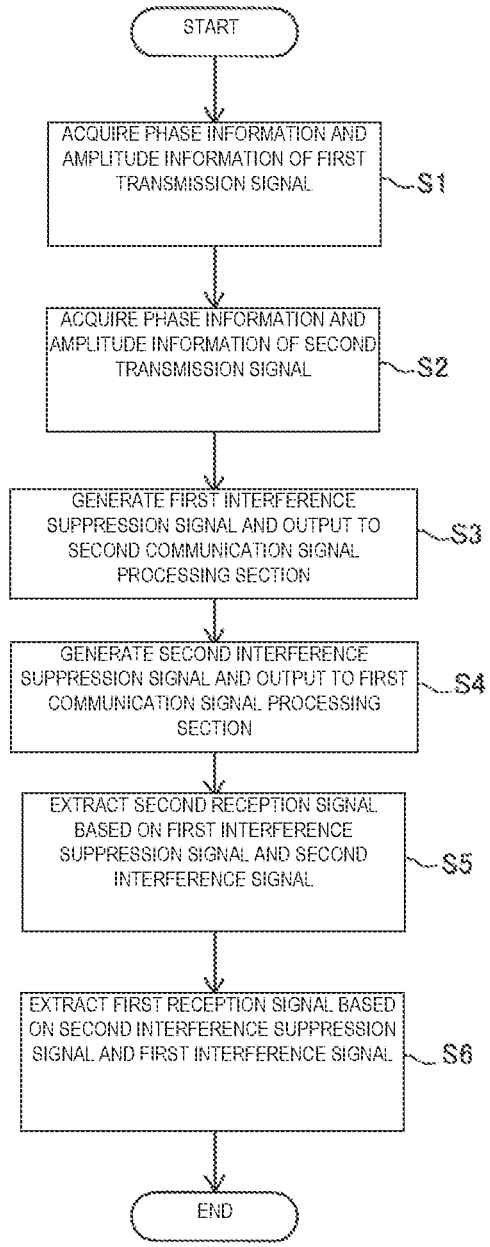
FIG. 16 is a flowchart illustrating a processing of suppressing interference ("interference suppression processing") by a control unit of a modification example of the first embodiment.

In the first embodiment above, an example of a configuration in which the control unit 3 performs the interference suppression processing as a parallel processing is illustrated, but the present invention is not limited to this. For example, as in a modification example of the first embodiment shown in FIG. 16, the control unit 3 can be configured to perform the processing of steps S1 to S4 as a series processing and perform the processing of steps S5 and S6 as a series processing. In the modification example of the first embodiment, whichever of the processing of step S1 and the processing of step S2 may be performed first. Whichever of the processing of step S3 and the processing of step S4 may be performed first. Whichever of the processing of step S5 and the processing of step S6 may be performed first. If the control unit 3 is configured to perform the interference suppression processing as a series processing, the wireless communication device 100 need to comprise the memory unit 4 because it is necessary to store the first one generated out of the first interference suppression signal 11 and the second interference suppression signal 21.

In the second embodiment above, an example of a configuration in which the control unit 30 performs the control for suppressing the interference in the first reception signal 10b and for suppressing the interference in the second reception signal 20b based on the communication quality including at least the communication speed is illustrated, but the present invention is not limited this. For example, the control unit 30 can be configured to perform a control for suppressing the interference in the first reception signal 10b and for suppressing the interference in the second reception signal 20b based on the amount of communication data, or the transmission rate, etc. When the control unit 30 is configured to perform the control for suppressing the interference in the first reception signal 10b and for suppressing the interference in the second reception signal 20b based on the communication quality other than the communication speed, such as the amount of the communication data or the transmission rate, etc., each of the first threshold Th1 and the second threshold Th2 may be set as a parameter related to the communication quality other than the communication speed, such as the amount of the communication data or the transmission rate, etc.

In the second embodiment described above, an example of a configuration in which the control unit 30 performs the control for suppressing the interference of the first reception signal 10b based on the communication status of the first communication signal 10 and the first threshold Th1, and performs the control for suppressing the interference of the second reception signal 20b based on the communication status of the second communication signal 20 and the second threshold Th2 is illustrated, but the present invention is not limited to this. For example, the control unit 30 can be configured to generate a plurality of first interference suppression signals 11 with different amplitudes and a plurality of second interference suppression signals 21 with different amplitudes, and select a first interference suppression signal 11 and a second interference suppression signal 21 that are the most suitable out of the plurality of the first interference suppression signals 11 and the plurality of the second interference suppression signals 21 that have been generated.

Figure 17:
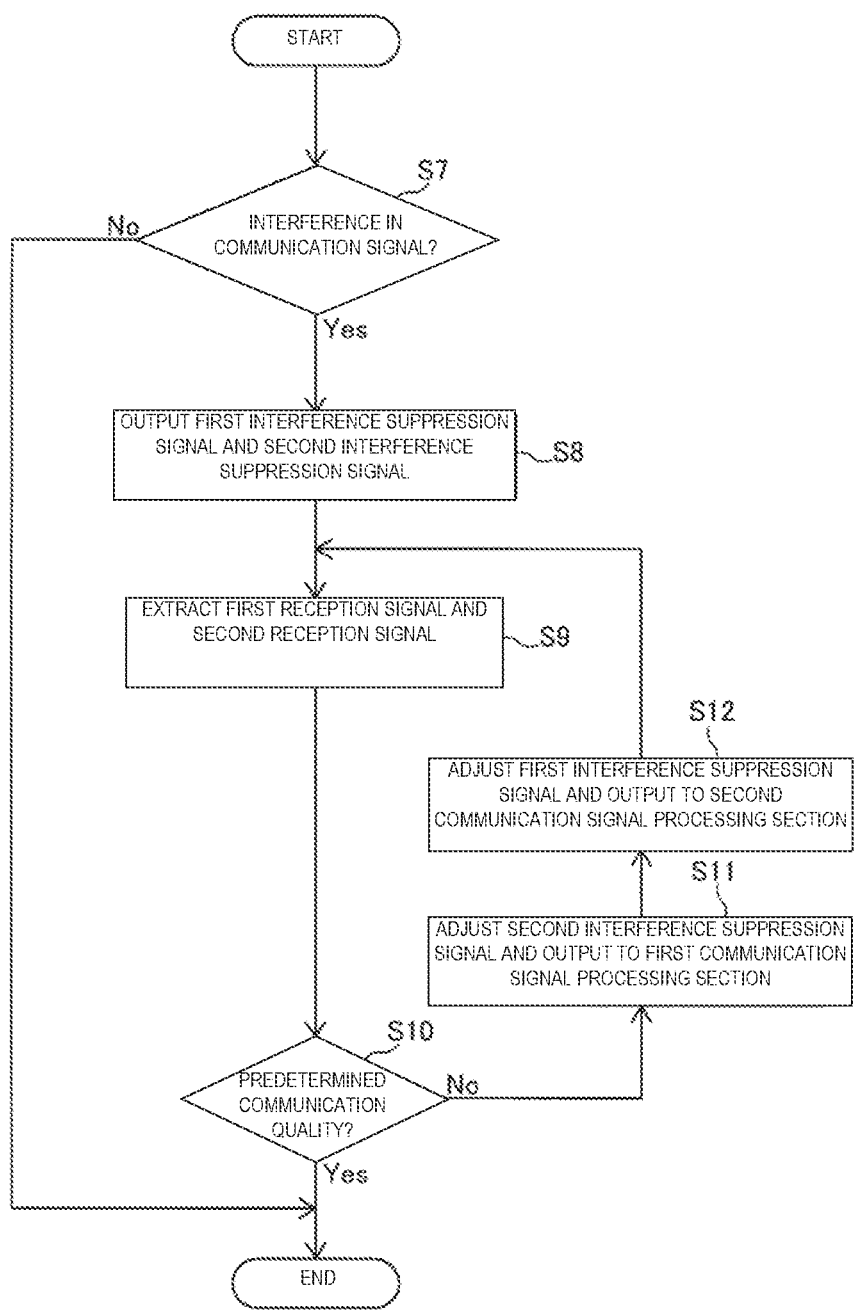
FIG. 17 is a flowchart illustrating a processing of suppressing interference ("interference suppression processing") by a control unit of a modification example of the second embodiment.

In the second embodiment above, an example of a configuration in which the control unit 30 executes the processing of steps S11 and S12 as a parallel processing is illustrated, but the present invention is not limited this. For example, as in a modification example of the second embodiment shown in FIG. 17, the control unit 30 can be configured to perform the processing of steps S11 and S12 as a series processing. If the control unit 30 is configured to perform the processing of steps S11 and S12 as a series processing, whichever of the processing of steps S11 and S12 can be executed first.

The first to fourth embodiments above, examples of a configuration in which the control unit 3 (30, 31, 32) performs a control for suppressing interference in a so-called real time, such as generating the first interference suppression signal 11 (the first interference suppression digital signal 110) and the second interference suppression signal 21 (the second interference suppression signal 210) while communicating with the first communication signal 10 and the second communication signal 20 are illustrated, but the present invention is not limited to this. For example, the control unit 3 (30, 31, 32) can be configured to generate the first interference suppression signal 11 (the first interference suppression digital signal 110) and the second interference suppression signal 21 (the second interference suppression signal 210) based on the content to be received in such a case when the wireless communication device 100 (200, 300, 400) streams a video image. In this case, the control unit 3 (30, 31, 32) can be configured to generate the first interference suppression signal 11 (the first interference suppression digital signal 110) and the second interference suppression signal 21 (the second interference suppression signal 210) if the communication speed is less than that required by the content to be received.

In the third embodiment described above, an example of a configuration in which the control unit 31 generates the first interference suppression signal 11 and the second interference suppression signal 21 based on the phase information 13 and the amplitude information 14 of the first transmission signal 10a and the phase information 23 and the amplitude information 24 of the second transmission signal 20a that have been stored in the memory unit 4 and performs the control for suppressing the interferences of the first reception signal 10b and the second reception signal 20b is illustrated, but the present invention is not limited to this. For example, the control unit 31 can be configured to generate the first interference suppression signal 11 and the second interference suppression signal 21 based on the phase information 13 and the amplitude information 14 of the first transmission signal 10a and the phase information 23 and the amplitude information 24 of the second transmission signal 20a that have been stored in an external storage device that is provided at a different location from the wireless communication device 300 and connected to the wireless communication device 300 via a network, and perform the control for suppressing the interferences of the first reception signal 10b and the second reception signal 20b.

Figure 18:
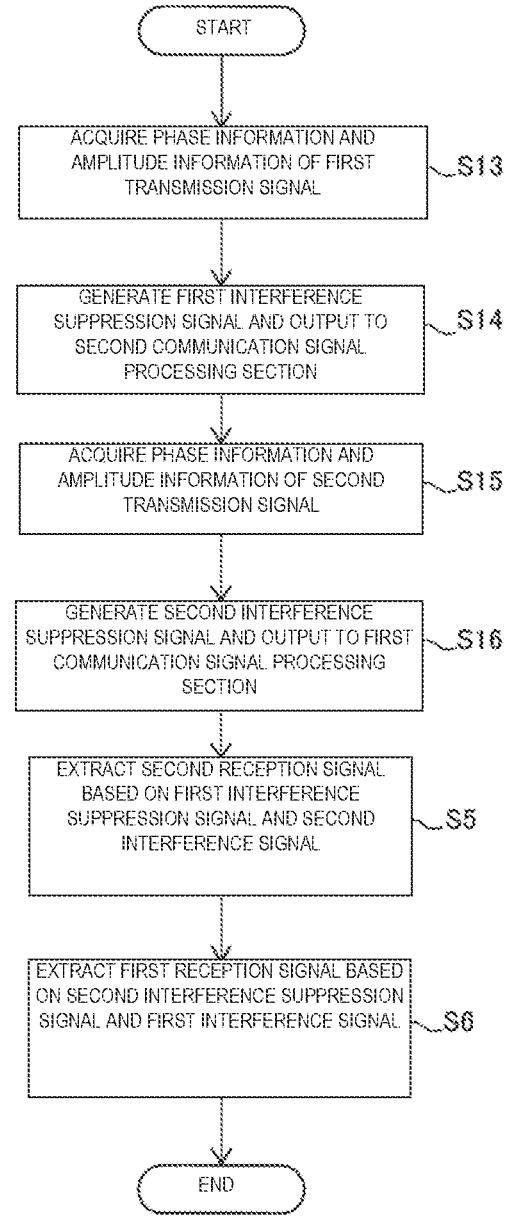
FIG. 18 is a flowchart illustrating a processing of suppressing interference ("interference suppression processing") by a control unit of a modification example of the third embodiment.

In the third embodiment above, an example of a configuration in which the control unit 31 executes the processing of steps S13 and S14 and the processing of steps S15 and S16 as a parallel processing, and executes the processing of steps S5 and S6 as a parallel processing is illustrated, but the present invention is not limited this. For example, as in a modification example of the third embodiment shown in FIG. 18, the control unit 31 can be configured to perform the processing of steps S13 to S15 as a series processing and perform the processing of steps S5 and S6 as a series processing. In the modification example of the third embodiment, whichever of the series processing of steps S13 and S14 and the series processing of steps S15 and S16 can be performed first. Also, whichever of the processing of step S5 and the processing of step S6 can be performed first.

Figure 19:
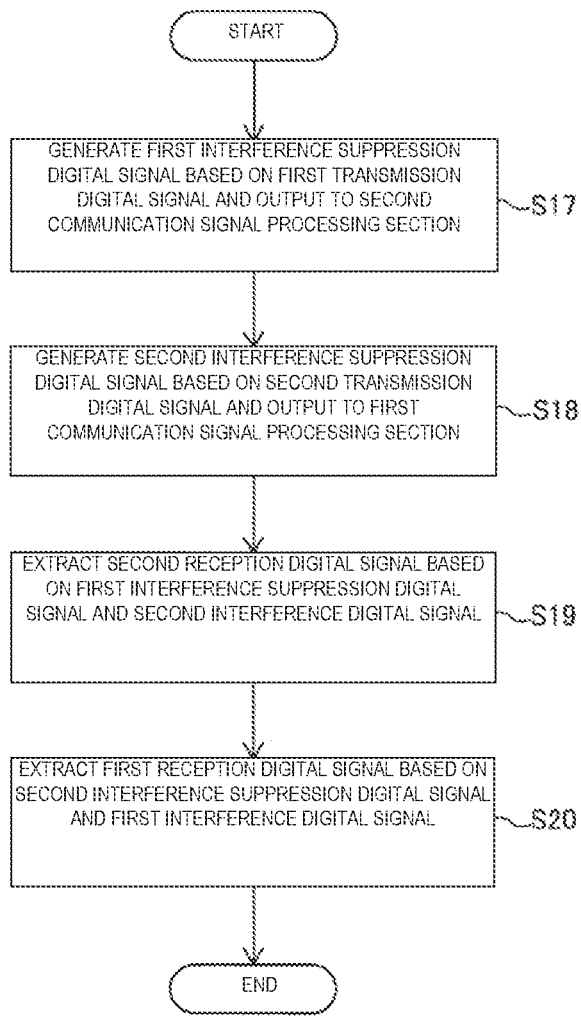
FIG. 19 is a flowchart illustrating a processing of suppressing interference ("interference suppression processing") by a control unit of a modification example of the fourth embodiment.

In the fourth embodiment above, an example of a configuration in which the control unit 32 executes the processing of step S17 and the processing of step S18 as a parallel processing, and executes the processing of step S19 and the processing of step S20 as a parallel processing is illustrated, but the present invention is not limited this. For example, as in a modification example of the fourth embodiment shown in FIG. 19, the control unit 32 can be configured to perform the processing of steps S17 and S18 as a series processing and perform the processing of steps S19 and S20 as a series processing. In the modification example of the fourth embodiment, whichever of the processing of step S17 and the processing of step S18 can be performed first. Also, whichever of the processing of step S19 and the processing of step S20 can be performed first.

In the first to fourth embodiments above, examples of a configuration in which the wireless communication device 100 (200, 300, 400) communicates by Wi-Fi (registered trademark) as the first communication standard and communicates by Bluetooth (registered trademark) as the second communication standard are illustrated, but the present invention is not limited to this. For example, the wireless communication device 100 (200, 300, 400) can be configured to communicate by Bluetooth (registered trademark) as the first communication standard and communicate by Wi-Fi (registered trademark) as the second communication standard.

In the first to fourth embodiments above, examples of a configuration in which the wireless communication device 100 (200, 300, 400) each communicates using the communication signals in the 2.4 GHz band are illustrated, but the present invention is not limited to this. For example, the wireless communication device 100 (200, 300, 400) can use communication signals of any frequency band as long as the frequency bands of the communication signals overlap with each other and the communication methods have different communication standards from each other.

[1] In view of the state of the known technology and in accordance with a first aspect of the present disclosure, a wireless communication device comprises a first communication unit configured to communicate wirelessly by a first communication signal according to a first communication standard, a second communication unit configured to communicate wirelessly by a second communication signal whose frequency band overlaps with that of the first communication signal according to a second communication standard that is different from the first communication standard, and a single control unit configured to generate a first interference suppression signal for suppressing interference caused by the first communication signal in the second communication signal and a second interference suppression signal for suppressing interference caused by the second communication signal in the first communication signal, and perform a control for suppressing the interference in the first communication signal and the interference in the second communication signal based on the first interference suppression signal and the second interference suppression signal that have been generated.

The wireless communication device according to the first aspect comprises the single control unit configured to perform the control for suppressing the interference in the first communication signal and the interference in the second communication signal based on the first interference suppression signal and the second interference suppression signal that have been generated, as described above. This allows the first interference suppression signal to suppress the interference in the second communication signal, and allows the second interference suppression signal to suppresses the interference in the first communication signal. As a result, even when communication is performed using signals with frequency bands that overlap with each other, it is possible to suppress the reduction of the reception sensitivity in each communication by suppressing the interference caused by each signal in each communication. Since the single control unit can suppress the interference in each communication signal, an increase in the number of parts and complexity of the configuration can be suppressed compared to, for example, a configuration with multiple control units for generating interference suppression signals for communication signals, respectively.

[2] In accordance with an embodiment according to the wireless communication device mentioned above, the control unit is configured to suppress the interferences in the first communication signal and the second communication signal by inputting the first interference suppression signal having inverse characteristics of the first communication signal to the second communication unit when the first communication unit communicates, and by inputting the second interference suppression signal having inverse characteristics of the second communication signal to the first communication unit when the second communication unit communicates. With this configuration, the signal component of the first communication signal is canceled by the first interference suppression signal having the inverse characteristics of the first communication signal. Therefore, even when both the first communication signal and the second communication signal are input to the second communication unit, the first communication signal is canceled out, and thus the interference in the second communication signal can be easily suppressed. Furthermore, the signal component of the second communication signal is canceled by the second interference suppression signal having the inverse characteristics of the second communication signal. Therefore, even when both the first communication signal and the second communication signal are input to the first communication unit, the second communication signal is canceled out, and thus the interference in the first communication signal can be easily suppressed. As a result, the reduction of the reception sensitivity in each communication can be easily suppressed. Here, a signal with the inverse characteristic of the first communication signal means a signal with a characteristic that cancels out the signal component of the first communication signal when it is input to the first communication signal. Furthermore, a signal with the inverse characteristic of the second communication signal means a signal with a characteristic that cancels out the signal component of the second communication signal when it is input to the second communication signal.

[3] In accordance with an embodiment according to any one of the wireless communication devices mentioned above, the control unit is configured to generate the first communication signal and the second communication signal, generate the first interference suppression signal having the inverse characteristic based on phase information and amplitude information of the first communication signal that has been generated, and generate the second interference suppression signal having the inverse characteristic based on phase information and amplitude information of the second communication signal that has been generated. With this configuration, the control unit generates the interference suppression signal based on the phase information and the amplitude information used to generate the signal transmitted by each communication unit, and thus can easily generate the interference suppression signal having the inverse characteristic of the signal component that is actually input to the communication unit and causes the interference. As a result, the interference in each communication signal can be easily suppressed.

[4] In accordance with an embodiment according to any one of the wireless communication devices mentioned above, the control unit is configured to perform a control for suppressing the interference in the first communication signal based on a communication status by the first communication unit, and perform a control for suppressing the interference in the second communication signal based on a communication status by the second communication unit. With this configuration, by performing the control for suppressing the interference based on the communication status by each communication unit, a processing for suppressing the interference can be performed only on the communication unit whose reception sensitivity has been reduced. As a result, the frequency of generating the interference suppression signals can be reduced compared to a configuration that always performs an interference suppression processing regardless of the communication environment, and thus the load on the control unit can be reduced.

[5] In accordance with an embodiment according to any one of the wireless communication devices mentioned above, the wireless communication device further comprises a memory unit, and the control unit is configured to perform the control for suppressing the interference in the first communication signal based on a threshold that has been set in advance with respect to a communication quality including at least a communication speed and stored in the memory unit and the communication status by the first communication unit, and perform the control for suppressing the interference in the second communication signal based on the threshold and the communication status by the second communication unit. With this configuration, the frequency of generating the interference suppression signal can be further reduced because the processing for suppressing the interference is performed based on the communication status and the communication quality. As a result, the load on the control unit can be further reduced.

[6] In accordance with an embodiment according to any one of the wireless communication devices mentioned above, the wireless communication device further comprises a memory unit, and the control unit is configured to store, when the first interference suppression signal and the second interference suppression signal are generated during calibration, phase information and amplitude information of the first communication signal and phase information and amplitude information of the second communication signal in the memory unit, generate the first interference suppression signal and the second interference suppression signal based on the phase information and the amplitude information of the first communication signal and the phase information and the amplitude information of the second communication signal that have been stored in the memory unit, and perform the control for suppressing the interferences in the first communication signal and the second communication signal. With this configuration, by generating the first interference suppression signal and the second interference suppression signal based on the phase information and the amplitude information of the first communication signal and the phase information and the amplitude information of the second communication signal that have been stored in the memory unit, the interferences in the first communication signal and the second communication signal can be suppressed.

As a result, compared to a configuration in which the control unit, each time it communicates, generates the first interference suppression signal by acquiring the phase information and the amplitude information of the first communication signal actually communicating and generates the second interference suppression signal by acquiring the phase information and the amplitude information of the second communication signal actually communicating, the load of the control unit can be reduced.

[7] In accordance with an embodiment according to any one of the wireless communication devices mentioned above, the control unit is configured to generate the first communication signal and the second communication signal as analog signals, generate the first interference suppression signal and the second interference suppression signal based on the first communication signal and the second communication signal that have been generated, and perform the control for suppressing the interferences in the first communication signal and the second communication signal based on the first interference suppression signal and the second interference suppression signal that have been generated. With this configuration, the first interference suppression signal and the second interference suppression signal may be generated as analog signals, and it is possible to easily generate the first interference suppression signal and the second interference suppression signal as analog signals by acquiring the phase information and the amplitude information of each of the first communication signal and the second communication signal.

[8] In accordance with an embodiment according to any one of the wireless communication devices mentioned above, the control unit is configured to generate the first communication signal and the second communication signal by converting first communication digital signal and second communication digital signal into analog signals, generate first interference suppression digital signal and second interference suppression digital signal based on the first communication digital signal and the second communication digital signal, and perform a control for suppressing interferences in the first communication digital signal and the second communication digital signal based on the first interference suppression digital signal and the second interference suppression digital signal that have been generated. With this configuration, the communication signals and the interference suppression signals can be processed as digital signals, and thus the effect of noise generated during processing can be suppressed compared to a configuration in which the communication signals and the interference suppression signals are processed as analog signals. As a result, the effects caused by noise can be suppressed in the processing of suppressing the interferences in the communication signals.

According to the present disclosure, as described above, a wireless communication device can be provided with which, even when communication is performed using signals with frequency bands that overlap with each other, it is possible to suppress the reduction of the reception sensitivity in each communication by suppressing the interference caused by each signal in each communication.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A wireless communication device comprising:
a first communication unit that wirelessly communicates by a first communication signal according to a first communication standard;
a second communication unit that wirelessly communicates by a second communication signal according to a second communication standard, the second communication signal having a frequency band that overlaps with that of the first communication signal, the second communication standard being different from the first communication standard; and
a single control unit that
generates a first interference suppression signal for suppressing interference caused by the first communication signal in the second communication signal and a second interference suppression signal for suppressing interference caused by the second communication signal in the first communication signal, and
suppresses the interference in the first communication signal and the interference in the second communication signal based on the first interference suppression signal and the second interference suppression signal,
the control unit further determining a communication quality by the first communication unit and a communication quality by the second communication unit,
the control unit starting suppressing the interference in the first communication signal according to a determination result of the communication quality by the first communication unit, and
the control unit starting suppressing the interference in the second communication signal according to a determination result of the communication quality by the second communication unit.

2. The wireless communication device according to claim 1, wherein
the control unit generates the first interference suppression signal such that the first interference suppression signal has inverse characteristics of the first communication signal, and
the control unit generates the second interference suppression signal such that the second interference suppression signal has inverse characteristics of the second communication signal.

3. The wireless communication device according to claim 1, wherein
the control unit generates the first communication signal and the second communication signal,
the control unit generates the first interference suppression signal based on phase information and amplitude information of the first communication signal, and
the control unit generates the second interference suppression signal based on phase information and amplitude information of the second communication signal.

4. The wireless communication device according to claim 3, wherein
the control unit generates the first interference suppression signal based on the phase information and the amplitude information of the first communication signal such that the first interference suppression signal has inverse characteristics of the first communication signal, and
the control unit generates the second interference suppression signal based on the phase information and the amplitude information of the second communication signal such that the second interference suppression signal has inverse characteristics of the second communication signal.

5. The wireless communication device according to claim 3, wherein
the control unit generates the first interference suppression signal based on the phase information and the amplitude information of the first communication signal such that the first interference suppression signal has the same amplitude as the first communication signal and inverted phase to the first communication signal, and the control unit generates the second interference suppression signal based on the phase information and the amplitude information of the second communication signal such that the second interference suppression signal has the same amplitude as the second communication signal and inverted phase to the second communication signal.

6. The wireless communication device according to claim 1, wherein the control unit suppresses the interference in the second communication signal by adding the first interference suppression signal to the second communication signal while the first communication unit communicates by the first communication signal, and the control unit suppresses the interference in the first communication signal by adding the second interference suppression signal to the first communication signal while the second communication unit communicates by the second communication signal.

7. The wireless communication device according to claim 1, wherein the control unit generates the first communication signal and the second communication signal as analog signals, the control unit generates the first interference suppression signal and the second interference suppression signal based on the first communication signal and the second communication signal, and the control unit suppresses the interference in the first communication signal and the interference in the second communication signal based on the first interference suppression signal and the second interference suppression signal.

8. The wireless communication device according to claim 1, wherein the control unit generates the first communication signal and the second communication signal by converting first communication digital signal and second communication digital signal into analog signals, the control unit generates first interference suppression digital signal and second interference suppression digital signal based on the first communication digital signal and the second communication digital signal, and the control unit suppresses interference in the first communication digital signal and interference in the second communication digital signal based on the first interference suppression digital signal and the second interference suppression digital signal.

9. The wireless communication device according to claim 8, wherein the control unit generates the first interference suppression digital signal such that the first interference suppression digital signal has inverse characteristics of the first communication digital signal, and the control unit generates the second interference suppression signal such that the second interference suppression digital signal has inverse characteristics of the second communication digital signal.

10. The wireless communication device according to claim 1, wherein the control unit generates the first interference suppression signal such that the first interference suppression signal has inverse characteristics of a first transmission signal of the first communication signal that is transmitted by the first communication unit, and the control unit generates the second interference suppression signal such that the second interference suppression signal has inverse characteristics of a second transmission signal of the second communication signal that is transmitted by the second communication unit.

11. A wireless communication device comprising:

a first communication unit that wirelessly communicates by a first communication signal according to a first communication standard;

a second communication unit that wirelessly communicates by a second communication signal according to a second communication standard, the second communication signal having a frequency band that overlaps with that of the first communication signal, the second communication standard being different from the first communication standard;

a single control unit that generates a first interference suppression signal for suppressing interference caused by the first communication signal in the second communication signal and a second interference suppression signal for suppressing interference caused by the second communication signal in the first communication signal, and suppresses the interference in the first communication signal and the interference in the second communication signal based on the first interference suppression signal and the second interference suppression signal; and a memory unit that stores a first threshold and a second threshold that have been set in advance with respect to a communication quality including at least a communication speed, the control unit suppressing the interference in the first communication signal based on the first threshold and a communication status by the first communication unit, and the control unit suppressing the interference in the second communication signal based on the second threshold and a communication status by the second communication unit.

12. The wireless communication device according to claim 11, wherein the control unit determines whether there is interference in the first communication signal by comparing the first threshold and the communication status by the first communication unit, and the control unit determines whether there is interference in the second communication signal by comparing the second threshold and the communication status by the second communication unit.

13. The wireless communication device according to claim 12, wherein in response to determining that there is interference in the first communication signal, the control unit suppresses the interference in the first communication signal based on the second interference suppression signal, and in response to determining that there is interference in the second communication signal, the control unit suppresses the interference in the second communication signal based on the second interference suppression signal.

14. A wireless communication device comprising:

a first communication unit that wirelessly communicates by a first communication signal according to a first communication standard;

a second communication unit that wirelessly communicates by a second communication signal according to a second communication standard, the second communication signal having a frequency band that overlaps with that of the first communication signal, the second communication standard being different from the first communication standard;

a single control unit that generates a first interference suppression signal for suppressing interference caused by the first communication signal in the second communication signal and a second interference suppression signal for suppressing interference caused by the second communication signal in the first communication signal, and suppresses the interference in the first communication signal and the interference in the second communication signal based on the first interference suppression signal and the second interference suppression signal; and a memory unit that stores phase information and amplitude information of the first communication signal and phase information and amplitude information of the second communication signal while the control unit generates the first interference suppression signal and the second interference suppression signal during calibration of the wireless communication device, the control unit generating the first interference suppression signal and the second interference suppression signal based on the phase information and the amplitude information of the first communication signal and the phase information and the amplitude information of the second communication signal that have been stored in the memory unit, and the control unit suppressing the interference in the first communication signal and the interference in the second communication signal based on the first interference suppression signal and the second interference suppression signal.

\* \* \* \* \*